US011889459B2

(12) United States Patent
Kazaz et al.

(10) Patent No.: US 11,889,459 B2
(45) Date of Patent: Jan. 30, 2024

(54) PHASE-BASED DISTANCE DETERMINATION FOR WIRELESS NETWORKS

(71) Applicants: Koninklijke KPN N.V., Rotterdam (NL); Technische Universiteit Delft, Delft (NL)

(72) Inventors: Tarik Kazaz, Rotterdam (NL); Mario Alberto Coutino Minguez, Rotterdam (NL); Gerardus Johannes Maria Janssen, Rotterdam (NL); Geert Jozef Therese Leus, Rotterdam (NL); Alle Jan Van der Veen, Rotterdam (NL)

(73) Assignees: KONINKLIJKE KPN N.V., Rotterdam (NL); TECHNISCHE UNIVERSITEIT DELFT, Delft (NL)

(*) Notice: Subject to any disclaimer, the term of this patent is extended or adjusted under 35 U.S.C. 154(b) by 309 days.

(21) Appl. No.: 17/433,942

(22) PCT Filed: Mar. 9, 2020

(86) PCT No.: PCT/EP2020/056275
§ 371 (c)(1),
(2) Date: Aug. 25, 2021

(87) PCT Pub. No.: WO2020/178459
PCT Pub. Date: Sep. 10, 2020

(65) Prior Publication Data
US 2022/0095262 A1  Mar. 24, 2022

Related U.S. Application Data

(60) Provisional application No. 62/815,164, filed on Mar. 7, 2019.

(51) Int. Cl.
*H04L 5/00* (2006.01)
*H04W 56/00* (2009.01)
(Continued)

(52) U.S. Cl.
CPC ............ *H04W 64/00* (2013.01); *G01S 11/08* (2013.01); *H04L 5/0048* (2013.01); *H04W 56/002* (2013.01)

(58) Field of Classification Search
CPC ............ H04W 56/001; H04W 56/003; H04W 56/0035
See application file for complete search history.

(56) References Cited

U.S. PATENT DOCUMENTS 5,918,161 A * 6/1999 Kumar .................... G01S 19/22
455/12.1
6,313,789 B1 * 11/2001 Zhodzishsky ........ H04B 1/7085
342/357.68
(Continued)

FOREIGN PATENT DOCUMENTS

EP            0865223 A2    9/1998
WO   WO 2015/196629 A1   12/2015
(Continued)

OTHER PUBLICATIONS

Kazaz, Tarik et al.: "*Joint Ranging and Clock Synchronization for Dense Heterogeneous IoT Networks*" 2018 52nd ASILOMAR Conference On Signals, Systems And Computers. IEEE. Oct. 28, 2018 (Oct. 28, 2018). pp. 2169-2173.
(Continued)

*Primary Examiner* — Kevin Kim
(74) *Attorney, Agent, or Firm* — HAMILTON, BROOK, SMITH & REYNOLDS, P.C.

(57) ABSTRACT

The invention relates to methods and systems for phase-based determination of a distance and/or a frequency offset between a first node and a second node in a wireless network. The method may comprise the first node transmitting a first request message based on a first carrier signal to
(Continued)

the second node and receiving a plurality of first response messages from the second node, the plurality of first response messages being transmitted based on a first reference carrier signal by the second node to the first node; the first node transmitting a second request message based on a second carrier signal to the second node and the first node receiving a plurality of second response messages from the second node, the plurality of second response messages being transmitted based on a second reference carrier signal by the second node to the first node; the first node receiving a first phase difference and second phase difference from the second node, the first phase difference defining a difference between a phase of the first carrier signal and a phase of the first reference carrier signal at a predetermined time instance associated with the first request message and the second phase defining a difference between a phase of the second carrier signal and a phase of the second reference carrier signal at a predetermined time instance associated with the second request message; the first node determining a set of third phase differences and a set of fourth phase differences based on the plurality of first response messages and the plurality of second response messages respectively, each of the set of third phase differences defining a difference between a phase of the first reference carrier signal and a phase of the first carrier signal at a predetermined time instance associated with one of the plurality of first response messages; and, each of the set of fourth phase differences defining a difference between a phase of the second reference carrier signal and a phase of the second carrier signal at a predetermined time instance associated with one of the plurality of second response messages; and, the first node and/or the second node determining a distance and/or a frequency offset between the first node and the second node based on the first and second phase difference and the set of third and fourth phase differences.

21 Claims, 9 Drawing Sheets

(51) Int. Cl.
*H04W 64/00* (2009.01)
*G01S 11/08* (2006.01)

(56) References Cited

U.S. PATENT DOCUMENTS

2016/0178744 A1   6/2016  Kluge et al.
2016/0209505 A1   7/2016  Kluge et al.

FOREIGN PATENT DOCUMENTS

WO   WO 2018/159913 A1   9/2018
WO   WO 2018/186663 A1   10/2018

OTHER PUBLICATIONS

Kazaz, Tarik: "Joint Ranging and Clock Synchronization for Dense Heterogeneous IoT Networks" paper presented at 2018 52nd ASILOMAR Conference On Signals, Systems And Computers. IEEE. (Oct. 31, 2018).

Pelka, Mathias et al.: "*Accurate radio distance estimation by phase measurements with multiple frequencies*" 2014 International Conference On Indoor Positioning And Indoor Navigation (IPIN). IEEE. Oct. 27, 2014 (Oct. 27, 2014). pp. 142-151.

International Search Report for International Application No. PCT/EP2020/056275, titled: "*Phase-Based Distance Determination for Wireless Networks*," dated Jun. 22, 2020.

\* cited by examiner

PHASE-BASED DISTANCE DETERMINATION FOR WIRELESS NETWORKS

This application is the U.S. National Stage of International Application No. PCT/EP2020/056275, filed Mar. 9, 2020, which designates the U.S., published in English, and claims the benefit of U.S. Provisional Application No. 62/815,164, filed Mar. 7, 2019. The entire teachings of the above applications are incorporated herein by reference.

FIELD OF THE INVENTION

The disclosure relates to phase-based distance and/or frequency offset determination for wireless networks; and, in particular, though not exclusively, to methods and systems for phase-based determination of a distance and/or frequency offset between a first wireless node and a second wireless node in a wireless network and a computer program product enabling a computer system to perform such methods.

BACKGROUND OF THE INVENTION

Accurate synchronization and localization are key requirements of current and future wireless networks (such as 5G and beyond) for among others internet of things (IoT) applications, such as those of smart industry, transport and logistics. For example, in a typical wireless IoT network, a number of IoT devices, hereafter also referred to as wireless nodes or simply nodes, may be connected via wireless communication means. Exemplary IoT networks may include wireless sensor networks (usually ad-hoc type networks) including sensor nodes that are capable monitoring and/or recording certain conditions or parameters, cellular IoT networks as those specified by 3GPP (for example GSM, UMTS, LTE, NB-IoT, 5G NR, that include cellular nodes that are connected via a standardized cellular network and other low-power, wide area networks such as LoRA and Sigfox. Depending on the needs of the applications, synchronisation may be required between different types of network nodes (between base stations, between devices, and between a base station and a device).

IoT networks enable distributed information processing tasks such as sensing, aggregation, and other tasks which benefit from node location information and network-wide synchronization. Typically, IoT nodes are low-power, low-complexity devices equipped with low-cost reference clock sources, i.e. local oscillators, and narrowband radio chips. The individual clocks of the nodes drift from each other due to local oscillator imperfections, environmental and voltage variations. Therefore, there is a need to periodically synchronize and calibrate the clocks to keep time synchronization among the nodes in the network. Clock drifts may have a direct impact on various IoT applications, for instance, it may cause errors in the distance determination between the nodes, which is a crucial input for most network localization techniques. Additionally, synchronization is of crucial importance for various medium-access network protocols, e.g. time-division multiple access (TDMA) protocols, and Time-Sensitive Networking (TSN).

Clock synchronization and node localization in IoT networks have received considerable attention in the past. Many research efforts have approached these problems as either separate or joint determination problems. Existing methods can be classified into (i) time-stamping methods based on wideband or ultra-wideband signals, and (ii) phase-based methods which utilize carrier phase measurements of narrowband signals. Timestamping based on ultra-wideband signals offer high timing resolution and a plethora of protocols and algorithms for joint distance determination and clock synchronization have been proposed. However, in general, these methods are not or at least less suitable for IoT networks due to constraints related to narrowband channels used for radio communication by the wireless nodes in such a network.

In contrast, methods based on phase-based distance determination, such as phase difference of arrival (PDoA) methods, are not hindered by the narrowband radio constraints. An example of a known phase-based distance determination method is described by e.g. M. Pelka et al., '*Accurate radio distance estimation by phase measurements with multiple frequencies*', in: 2014 international conference on Indoor Positioning and Indoor Navigation (IPIN) (IEEE 2014), pp. 142-151. Further, US2016/02090505 and US2016/0178744 describe schemes for determining a distance based on measuring phase differences between carrier signals exchanged between two wireless nodes.

These known phase-based distance determination methods do not consider the impact of unknown frequency offsets that may exist between carrier frequencies generated by the wireless nodes in a wireless network. These methods may result in a biased distance determination due to the influence of such frequency offsets which may be caused by local oscillator imperfections.

Hence, there is a need in the art for improved phase-based distance determination wherein the frequency offset caused by imperfections of the clock of a wireless node is taken into account.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can comprise, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including a functional or an object oriented programming language such as Java™, Scala, C++, Python or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer, server or virtualized server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), or graphics processing unit (GPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the embodiments in this disclosure to provide phase-based distance determination of nodes in a wireless network in which unknown frequency offsets between clocks of the nodes in the network are taken into account. The embodiments include a frequency offset and distance determination based on phase measurements of carrier signals that are transmitted between wireless nodes in a wireless network. In an embodiment, the phase measurements may be based on so-called phase difference of arrival (PDoA) measurements. Such PDoA measurements include the determination of a phase difference by a node, wherein a difference between a phase of a signal received by a node and a phase of a carrier signal of the receiving node is determined by a phase detector.

The embodiments further include a communication protocol for determining and collecting phase information, e.g. in the form of PDoA measurements, in a network. The phase information may include phase information, e.g. phase differences, associated with a two-dimensional (2D) set of equidistant (or requispaced) time instances (e.g. epoch time instances) and carrier frequencies. The determination of the phase information may be based on an accurate data model which may include hardware imperfections of the nodes, e.g. frequency errors of the local oscillators and wireless channel effects.

In an embodiment, a data matrix comprising rows and columns may be determined wherein each row represents phase information acquired at one carrier frequency but at different time instances and each column represents phase information acquired at different carrier frequencies. The data matrix exhibits a structure that allows so-called 2D frequency determination techniques, based on methods known from modelling and analysing phased array antennas. It can be shown that the data matrix has rank one and its principal singular vectors have a shift invariance property which enables joint determination of the frequency offset and distance. In a further embodiment, an algorithm for joint frequency offset and distance determination is based on a weighted least squares (WLS) approximation. Using the 2D frequency determination technique, from the shift invariance structure of the left singular vector the distance may be estimated, while from the shift invariance structure of the right singular vector the frequency offset or frequency error may be estimated.

In one aspect, the invention may relate to a method for determining a distance and/or a frequency offset between a first node and a second node in a wireless network.

In an embodiment, the method may include at least one or more of the following steps: the first node transmitting a first request message based on a first carrier signal to the second node and receiving a plurality of first response messages from the second node, the plurality of first response messages being transmitted based on a first reference carrier signal by the second node to the first node; the first node transmitting a second request message based on a second carrier signal to the second node and the first node receiving a plurality of second response messages from the second node, the plurality of second response messages being transmitted based on a second reference carrier signal by the second node to the first node; the first node receiving a first phase difference and second phase difference from the second node, the first phase difference defining a difference between a phase of the first carrier signal and a phase of the first reference carrier signal at a predetermined time instance associated with the first request message and the second phase defining a difference between a phase of the second carrier signal and a phase of the second reference carrier signal at a predetermined time instance associated with the second request message; the first node determining a set of third phase differences and a set of fourth phase differences based on the plurality of first response messages and the plurality of second response messages respectively, each of the set of third phase differences defining a difference between a phase of the first reference carrier signal and a phase of the first carrier signal at a predetermined time instance associated with one of the plurality of first response messages; and, each of the set of fourth phase differences defining a difference between a phase of the second reference carrier signal and a phase of the second carrier signal at a predetermined time instance associated with one of the plurality of second response messages.

In an embodiment, the method may further include: determining a distance and/or a frequency offset between the first node and the second node based on the first and second phase difference and the set of third and fourth phase differences.

In an embodiment, the first node may determine the distance and/or frequency offset based on the first and second phase difference and the set of third and fourth phase differences.

In another embodiment, the first node may send the first and second phase difference and the set of third and fourth phase differences to a further node that is configured to compute the distance and/or frequency offset based on the first and second phase difference and the set of third and fourth phase differences.

In an embodiment, the first node may be a sensor node and the second node may be an anchor node or a base station.

The distance may also be expressed as a path delay. A path delay is the time between transmission of a signal by the first node and reception of the signal by the second node. The path delay is also known as propagation delay, propagation time, transit time, or (signal) travel time. Preferably, the carrier frequency and the reference carrier frequency are approximately the same, up to a frequency offset error. Such approximately equal frequencies are also known as corresponding frequencies. The maximum tolerated frequency difference between corresponding frequencies may depend on e.g. communication standard, channel bandwidth, system design, et cetera. In an embodiment, the frequency offset between two corresponding frequencies may be less than 80 ppm.

In an embodiment, the method may further include: the first node may send phase difference information (the first and second phase difference) to the second node, either instead of or in addition to receiving phase information (the set of third and fourth phase differences) from the second node. Thus, in such embodiments, the second node may determine the distance and/or frequency offset between the first node and the second node. In a further embodiment, the method may include: the first node receiving the computed distance and/or frequency offset from the second node. Hence, the second node may communicate the computed distance and/or frequency offset to the first node, e.g. when the first node has a very low computational power. In some embodiments, the first node may receive the plurality of response signals from the second node before transmitting the request signals.

An advantage of the first node receiving more than one response message at the same frequency, i.e. using the same (reference) carrier signal for each transmitted request message, is that this makes it possible to correct for differences in frequency (also known as frequency offset or frequency shift), which may result from e.g. differences in clock frequency (also known as clock drift, clock rate offset or clock skew). This correction removes the bias from the clock rate offset on the path delay estimates, thus allowing for a more accurate determination of the path delay, and hence of the distance between the first node and second node. Furthermore, it enables accurate clock frequency synchronization of the first node relative to the second node. Additionally, receiving a plurality of response messages reduces the random error in the signal due to noise, thus increasing the accuracy.

Known methods to determine a path delay between a first and second nodes based on phase difference of arrival (PDoA) principles assume that both nodes use the same carrier frequency of which the phase difference is determined. However, in practice there may be a noticeable frequency offset, in particular in small, economical devices such as many IoT devices. An advantage of the embodiments described in this application is that both the frequency offset and the path delay may be determined simultaneously, increasing the accuracy of the path delay or distance determination and allowing for inter-device clock synchronisation. By choosing the signals in a 2D-pattern (varying frequencies at predetermined time delays at fixed time intervals and varying time delays at fixed frequencies), both parameters may efficiently be determined by, essentially, using the same signals for two purposes.

In an embodiment, the first carrier signal may be associate with a first carrier frequency and the first reference carrier signal may be associated with a first reference carrier frequency, wherein the first carrier frequency and the first reference carrier frequency may form a first frequency channel between the first node and the second node and wherein the second carrier signal may be associated with a second carrier frequency and the second reference carrier signal may be associated with a second reference carrier frequency, the second carrier frequency and the second reference carrier frequency form a second frequency channel between the first node and the second node.

Wireless communication standard such as GSM, UMTS, LTE, NB-IoT, 5G NR, ZigBee, WiFi, and Bluetooth may define frequency channels for communication at predefined frequencies. These standards typically allow a certain frequency deviation within a frequency channel. For example, the ZigBee (IEEE 802.15.4) standard defines a channel bandwidth of 2 MHz. The maximum frequency offset between carrier frequencies that should be supported while keeping communication functionalities is +/−100 kHz, translating to a tolerated frequency offset of roughly +/−40 ppm.

In an embodiment, determining a distance and/or a frequency offset between the first node and the second node may comprise: combining, preferably adding, the first phase difference with each of the second phase differences and combining the third phase difference with each of the fourth phase differences. Adding the phase differences, or equivalently multiplying the exponentiations of the phase differences, allows for corrections of symmetric nuisance factors, e.g. unknown phase differences due to carrier frequency switching. This may require that there is no carrier frequency switching between sending the first signal and receiving the last signal of a single set of request and response signal exchanges.

In an aspect, the invention may relate to method for determining a distance and/or a frequency offset between a first node and an second node in a wireless network, wherein the method may include one or more of the following steps: the first node transmitting request messages based on carrier signals at different carrier frequencies to the second node and receiving for each of the request signals, a time series of response messages from the second node, wherein for each of the request messages the time series of response messages being transmitted based on one of reference carrier signals, each one of the reference carrier signals being transmitted at one of reference carrier frequencies by the second node to the first node, wherein the carrier frequencies and the reference carrier frequencies form frequency channels between the first node and the second node; the first node receiving first phase differences from the second node, each of the first phase differences defining a difference between a phase of one the carrier signals and a phase of one of the reference carrier signals at a predetermined time instance associated with one of first request messages, the frequency of the one of the carrier signals and the frequency of the one of the reference carrier signals being in the same frequency channel; the first node determining second phase differences based on the request signals and the response messages, the determining of the second phase differences including computing for each one of the carrier signals phase differences, each of the phase differences defining a difference between a phase of one of the reference carrier signals and a phase of one of the carrier signals at a predetermined time instance associated with one of the time series of response messages.

In an embodiment, the method may further include: determining a distance and/or a frequency offset between the first node and the second node based on the first phase differences and the second phase differences.

In an embodiment, the first node may determine the distance and/or frequency offset based on the first phase differences and the second phase differences.

In another embodiment, the method may include the first node sending the first and second phase differences to a further node that is configured to compute the distance and/or frequency offset based on the first phase differences and the second phase differences.

In a further embodiment, the method may include the first node sending phase difference information (the second phase differences) to the second node, either instead of or in addition to receiving phase information (the first phase differences) from the second node. Thus, in such embodiments, the second node may determine the distance and/or frequency offset between the first node and the second node based on the first phase differences and the second phase differences. In a further embodiment, the method may include: the first node receiving the computed distance and/or frequency offset from the second node.

In a further aspect, the invention may relate to method for determining a distance and/or a frequency offset between a first node and an second node in a wireless network, wherein the method may include one or more of the following steps: the method may include one or more of the following steps: the first node transmitting N request messages based on N carrier signals at N carrier frequencies to the second node and receiving for each of the N request signals, a time series of P response messages from the second node, wherein for each of the N request messages the time series of P response messages being transmitted based on one of N reference carrier signals, each one of the N reference carrier signals being transmitted at one of N reference carrier frequencies by the second node to the first node, wherein the N carrier frequencies and the N reference carrier frequencies form N frequency channels between the first node and the second node; the first node receiving N phase differences from the second node, each of the N phase differences defining a difference between a phase of one the N carrier signals and a phase of one of the N reference carrier signals at a predetermined time instance associated with one of N first request messages, the frequency of the one of the N carrier signals and the frequency of the one of the N reference carrier signals being in the same frequency channel; the first node determining P×N phase differences based on the N request signals and the P response messages, the determining of the P×N phase differences including computing for each one of the N carrier signals P phase differences, each of the P phase differences defining a difference between a phase of one of the N reference carrier signals and a phase of one of the N carrier signals at a predetermined time instance associated with one of the time series of P response messages.

In an embodiment, the method may include determining a distance and/or a frequency offset between the first node and the second node based on the N phase differences and the P×N phase differences. The distance and/or frequency offset may be computed by the first node, the second node or a further node in a similar way as the above-described embodiments.

An advantage of using more than two frequency channels, is that this may further increase the accuracy and/or the resolution of the distance determination. In some embodiments, using additional frequency channels may also increase the unambiguous range, i.e. the maximum range over which a distance may be unambiguously determined.

In an embodiment, differences between one or more first carrier frequencies of the N carrier frequencies and one or more second carrier frequencies of the N carrier frequencies are integer multiples of a predetermined frequency difference. An advantage of choosing equispaced frequencies, is that it may simplify determination of a distance on the basis of the measured and received phase differences.

In an embodiment, the first node may transmit the response messages at an n-th carrier frequency as a time sequence of response messages to the first node, wherein a time interval between the p-th and the (p+1)-th response message of a time sequence of response messages may be defined as $\Delta t^{(n,p+1)} - \Delta t^{(n,p)} = \Delta t/n$, where $p=1, \ldots, P-1$ and $n=1, \ldots, N$. $\Delta t$ may be a predetermined time interval. An advantage of choosing such equispaced time intervals is, that it may simplify determination of a frequency offset, and hence path delay and/or distance, on the basis of measured and received phase differences. It is particularly advantageous to select both the frequencies such that they are equispaced, and the time intervals such that they are equispaced, as doing so allows for joint determination of frequency offset and path delay. This way, each phase difference measurement may effectively be used for both frequency offset and path delay determination, increasing the efficiency of the method and/or reducing the error due to noise. The time intervals $\Delta t^{(n,p)}$ may be equispaced related to a carrier frequency n (i.e. $\Delta t^{(n,p)}$ may be equispaced for fixed n and p=1, ..., P), while the set of time instances may not be equispaced with respect to different carrier frequencies (i.e. $\Delta t^{(n,p)}$ may not be equispaced for fixed p and n=1, N).

In an embodiment, determining a distance and/or a frequency offset between the first node and the second node may comprise: the first node determining a P×N matrix M, each element m(n, p) of the matrix M being based on the phase difference of the n-th request signal and the phase difference of the p-th response signal to the n-th request signal. In an embodiment, the method may further comprise: determining a low-rank approximation of M, preferably a rank-one approximation of M and determining principal orthonormal basis vectors u and v with dimensions P and N, respectively; and determining a frequency offset based on the vector u and a distance based on the vector v. This method of determining the frequency offset and the distance is highly efficient and very accurate.

In an embodiment, the method may further comprise: determining a best fit for a constant $\varphi$, where $\varphi$ is defined by $\varphi^{i-j} \approx u_i/u_j$ for one or more pairs of elements $u_i$, $u_j$ of the vector u wherein i,j=1, P and i≠j; and/or determining a best fit for a constant $\gamma$, where $\gamma$ is defined by $\gamma^{i-j} \approx v_i/v_j$ for one or more pairs of elements $v_i$, $v_j$ of the vector v wherein i,j=1, ..., N, and i≠j. For example, a best fit for $\varphi$ may be determined by solving the set of equations $u_i = u_{i-1}\varphi$ for i=2, ..., P, and a best fit for $\gamma$ may be determined by solving the set of equations $v_i = v_{i-1}\gamma$ for i=2, ..., N.

In an embodiment, the best fit for $\varphi$ and/or the best fit for $\gamma$ is determined using a least squares method or using a weighted least squares method. This way, a good estimate for the frequency offset may be determined from the best fit for $\varphi$ and/or a good estimate for the path delay may be determined from the best fit for $\gamma$.

In an embodiment, the method may further comprise: determining a difference in clock rate between the first wireless node and the second wireless node based on the frequency offset. Such a difference in clock rate may be used to determine or predict other errors, or for synchronisation between various nodes.

In an embodiment, the method may further comprise: synchronising a clock of the first wireless node and a clock of the second wireless node based on the frequency offset or the determined difference in clock rate. Synchronised clocks allow for synchronised communication protocols and decrease interference in dense wireless networks.

In an embodiment, the first node and the second node may communicate on the basis of a WiFi standard IEEE 802.11 a/g/b/ac/ah/n/p, a Bluetooth standard, a ZigBee standard IEEE 802.15.4, or a wireless telecommunication standard such as GSM, UMTS, LTE, NB-IoT, 5G NR, LoRA, Sigfox; and/or, the request and response messages may have a data format in accordance to the WiFi standard IEEE 802.11 a/g/b/ac/ah/n/p, the Bluetooth standard, the ZigBee standard IEEE 802.15.4, or a wireless telecommunication standard such as GSM, UMTS, LTE, NB-IoT, 5G NR, LoRA, Sigfox.

In an embodiment, the method may be executed by nodes comprising narrowband radio devices. This type of devices is relatively likely to suffer from frequency offsets, and typically generate equispaced carrier frequencies that may be used to efficiently execute the method.

In an embodiment, the method may further comprise determining a position of a first node, based on a plurality of distances to second nodes, determined according to any of the preceding methods.

In an embodiment, the first node may comprise a transceiver, an oscillator coupled to a frequency synthesizer for generating N carrier signals at N different carrier frequencies and a phase detector configured to determine a phase difference between a phase of a response signal received by the first node from the second node and a phase of a carrier signal selected from the N carrier signals.

In an embodiment, computing a distance between the first node and the second node comprises computing a distance based on a path delay. For many applications the distance is a more useful quantity than the path delay of a signal transmitted between two nodes; such a distance is e.g. more easily interpreted by a human. However, determining a path delay may be computationally more straightforward.

In an aspect, the invention may relate to a method for determining a position, comprising determining a plurality of distances according to any of the methods described above; and determining a position based on the plurality of distances.

In an aspect, the invention may relate to a wireless node comprising a transceiver, an oscillator coupled to a frequency synthesizer for generating carrier signals at different carrier frequencies, a phase detector configured to determine a phase difference between a phase of a response signal received by the node from a further node and a phase of a carrier signal selected from the different carrier signals, a computer readable storage medium having at least part of a program embodied therewith; and, a processor, preferably a microprocessor, coupled to the computer readable storage medium and the transceiver, wherein responsive to executing the computer readable program code, the processor is configured to perform executable operations comprising: transmitting a first request message based on a first carrier signal to the further node and receiving a plurality of first response messages from the further node, the plurality of first response messages being transmitted based on a first reference carrier signal by the further node to the node; transmitting a second request message based on a second carrier signal to the further node and receiving a plurality of second response messages from the further node, the plurality of second response messages being transmitted based on a second reference carrier signal by the further node to the node; receiving a first phase difference and second phase difference from the further node, the first phase difference defining a difference between a phase of the first carrier signal and a phase of the first reference carrier signal at a predetermined time instance associated with the first request message and the second phase defining a difference between a phase of the second carrier signal and a phase of the second reference carrier signal at a predetermined time instance associated with the second request message; determining a set of third phase differences and a set of fourth phase differences based on the plurality of first response messages and the plurality of second response messages respectively, each of the set of third phase differences defining a difference between a phase of the first reference carrier signal and a phase of the first carrier signal at a predetermined time instance associated with one of the plurality of first response messages; and, each of the set of fourth phase differences defining a difference between a phase of the second reference carrier signal and a phase of the second carrier signal at a predetermined time instance associated with one of the plurality of second response messages.

In an embodiment, the executable operation may further include: determining a distance and/or a frequency offset between the first node and the second node based on the first and second phase difference and the set of third and fourth phase differences; or, transmitting the first and second phase difference and the set of third and fourth phase differences to a further node that is configured to compute the distance and/or the frequency offset based on the first and second phase difference and the set of third and fourth phase differences.

In a further aspect, the invention may relate to a wireless node, the wireless node may comprising a transceiver, an oscillator coupled to a frequency synthesizer for generating carrier signals of different carrier frequencies, a phase detector configured to determine a phase difference between a phase of a response signal received by the node from an further node and a phase of a carrier signal selected from the carrier signals, a computer readable storage medium having at least part of a program embodied therewith; and, a processor, preferably a microprocessor, coupled to the computer readable storage medium and the transceiver, wherein responsive to executing the computer readable program code, the processor is configured to perform executable operations comprising: transmitting request messages based on carrier signals at carrier frequencies to the further node and receiving for each of the request signals, a time series of response messages from the further node, wherein for each of the request messages the time series of response messages being transmitted based on one of reference carrier signals, each one of the reference carrier signals being transmitted at one of reference carrier frequencies by the further node to the node, wherein the carrier frequencies and the reference carrier frequencies form frequency channels between the node and the further node; receiving first phase differences from the further node, each of the first phase differences defining a difference between a phase of one the carrier signals and a phase of one of the reference carrier signals at a predetermined time instance associated with one of first request messages, the frequency of the one of the carrier signals and the frequency of the one of the references carrier signals being in the same frequency channel; determining second phase differences based on the request signals and the response messages, the determining of the second phase differences including computing for each one of the carrier signals phase differences, each of the phase differences defining a difference between a phase of one of the reference carrier signals and a phase of one of the carrier signals at a predetermined time instance associated with one of the time series of response messages.

In an embodiment, the executable operation may further include: determining a distance and/or a frequency offset between the first node and the second node based on the first and second phase differences.

In another embodiment, the executable operation may further include: transmitting the first and second phase differences to a further node that is configured to compute the distance and/or the frequency offset based on the first and second phase differences.

In a further aspect, the invention may relate to a node configured for executing the method steps according to any of the process steps described above.

In a further aspect, the invention may also relate to a computer program product comprising software code portions configured for, when run by a computer, executing the method steps according to any of the process steps described above.

The invention will be further illustrated with reference to the attached drawings, which schematically will show embodiments according to the invention. It will be understood that the invention is not in any way restricted to these specific embodiments.

DETAILED DESCRIPTION

In this disclosure embodiments are described of methods and systems to jointly determine the distance between two wireless nodes, e.g. two radio transceivers, and the frequency offset of the carrier frequencies used by the two wireless nodes to communicate with each other. The methods and systems will be described hereunder in more detail. An objective of the embodiments described in this disclosure is then to estimate a clock rate offset $\eta_0$ and a distance $d_{01}$ between two radio transceivers given the two-way communication between nodes and PDoA functionalities of the wireless nodes. More in particular, it is an objective of the embodiments described in the disclosure to provide a method for collecting measurements that allows joint frequency offset and distance determination.

Although the embodiments described with references to the figures are based on wireless sensor networks including sensor nodes and anchor nodes, these figures and the associated description of these embodiments are not intended to be exhaustive or limited to the invention. Many modifications and variations will be apparent to those of ordinary skill in the art without departing from the scope and spirit of the invention. For example, the invention may be used with any low-power wide-area wireless IoT networks, including cellular IoT networks as for example specified by 3GPP or similar standard setting organisations. Here, the term node refers to wireless network nodes that are used in such IoT network. Depending on the type of IoT network such nodes may be named differently.

Figure 1:
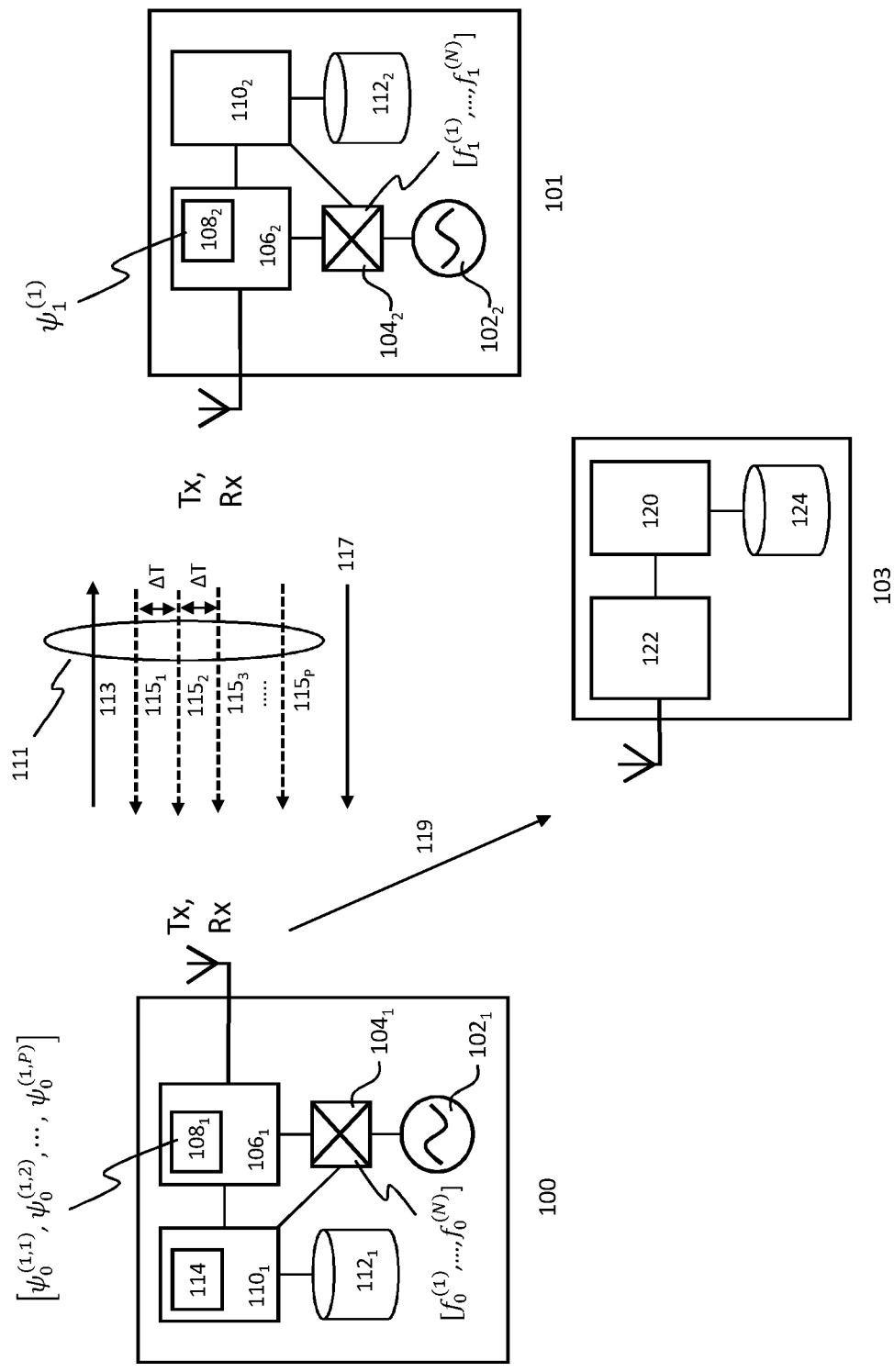
FIG. 1 schematically depicts part of a wireless network according to an embodiment of the invention.

FIG. 1 schematically depicts part of a wireless sensor network according to an embodiment of the invention. The network may include a plurality of wireless nodes, including at least one sensor node 100 and at least one anchor node (or base station) 101. Each wireless node may include a radio transceiver $106_{1,2}$ connected to a clock oscillator $102_{1,2}$ and a frequency synthesizer $104_{1,2}$. The transceiver and the frequency synthesizer may be controlled by a processor $110_{1,2}$, which is further connected to a memory $112_{1,2}$. Based on the local clock oscillators the frequency synthesizers of the wireless sensors may be configured to generate a set of carrier frequencies which is common to each wireless node in the sensor network. For example, as shown in FIG. 1, the frequency synthesizer of the sensor node may be configured to generate a set of N carrier frequencies $f_0^{(1)}, \ldots, f_0^{(N)}$ and the anchor node may be configured to generate N reference carrier frequencies $f_1^{(1)}, \ldots, f_1^{(N)}$ wherein lower index i identifies the sensor node (i=0) and anchor node (i=1) respectively. The processor may control the transceiver to transmit and receive (unmodulated) carrier signals at carrier frequencies that are part of the set of carrier frequencies. Due to small differences in the clock oscillators of the different wireless nodes, a small frequency offset may be present between carrier frequencies generated by the frequency generators of the sensor and anchor nodes, e.g. a frequency difference (or frequency offset) between $f_0^{(1)}$ and $f_1^{(1)}$, between $f_0^{(2)}$ and $f_1^{(2)}$, etc. Frequencies with identical upper index (n) may be called corresponding frequencies.

Further, each of the wireless nodes may include a phase detector $108_{1,2}$ for detecting a phase difference between a (carrier) signal received by a wireless node and a carrier signal generated by a wireless node, where the received signal and the node's own carrier signal typically have corresponding frequencies. Phase differences measured by the phase detectors during the exchange of (carrier) signals are used to compute an accurate estimate of the distance between the sensor and anchor nodes, wherein carrier frequencies generated by nodes may have an unknown frequency offset. To that end, a protocol may be executed by the sensor and anchor nodes wherein the sensor node may transmit a first request signal 113 at a first carrier frequency $f_0^{(1)}$ to the anchor node and in response to the reception of the first request signal, the anchor node may transmit a plurality of first response signals $115_{1-P}$ at a first reference carrier frequency $f_1^{(1)}$ to the sensor node. In an embodiment, the first response signals may be transmitted as a time sequence of first response signals to the sensor node, wherein the time intervals ΔT between subsequent transmissions of first response signals are constant. In a further embodiment, the time intervals ΔT between subsequent transmissions may be computed according to a predetermined function.

During the exchange of the signals, both the sensor node and the anchor node may measure phase differences between received signals and locally generated carrier signals. In particular, upon reception of the first request signal 113 from the sensor node, the anchor node may determine a phase difference $\psi^{(1)}$ between the first request signal and a first anchor carrier signal at a first reference carrier frequency that is going to be transmitted by the anchor node in response to the reception of the first request signal. Here, lower index 1 identifies the anchor node. Similarly, during the exchange of the signals, the sensor node may determine a phase difference between the carrier signal used to transmit the first request signal 113 and each of the received first response signals $115_{1-P}$. In this way, the sensor node may determine a set of P phase differences $[\psi_0^{(1,1)}, \psi_0^{(1,2)}, \ldots, \psi_0^{(1,P)}]$ wherein lower index 0 identifies the sensor node. The sensor node may repeat the exchange of a request signal and a plurality of response signals a number of times at different carrier frequencies from the set of N carrier frequencies $f_0^{(1)}, \ldots, f_0^{(N)}$.

The phase differences measured by the anchor node may be transmitted in a message 117 by the anchor node to the sensor node. The phase differences measured during the exchange of the request and response signals may be collected by the sensor node and stored in its memory. A distance module 114 in the sensor node may use the measured phase differences to compute a time (a transit time) that is needed for exchanging a signal between the sensor node and the anchor node. The transit time is directly related to the distance between the sensor node and the anchor node. Additionally, the distance module may also determine the frequency offset between the signals exchanged at a certain carrier frequency between the sensor node and the anchor node.

The computed distance may be transmitted by the sensor node to a data processing unit 103, which may include a transceiver 122 for wireless communication with the wireless nodes of the sensor network. The transceiver may be controlled by a processor 120 that is connected to a memory 124. The sensor node may execute the above-described protocol with further anchor nodes (not shown in FIG. 1) in the wireless network. This way, the sensor node may determine a distance between several anchor nodes in the network and each of the determined distances may be sent to the data processing unit, which may compute a position of the sensor node based on the distances and information about the position of at least one anchor node. A distance may also be determined with respect to a plurality of sensor nodes, in so-called peer-to-peer positioning.

Phase detectors configured to detect such phase differences are known from US2016/02090505 and US2016/0178744, which are hereby incorporated by reference into this disclosure. During exchange of carrier signals between two wireless nodes, the phase detectors of the wireless nodes may detect phase differences and store the measured phase differences as phase information in the memory. After exchange of (part of) the carrier signals, one wireless node may transmit the measured phase differences to the other wireless node.

The above-described protocol and the algorithm (the model) that is used to determine a distance between the sensor node and the anchor node taking into account that an unknown frequency offset (a clock skew) between the carrier frequencies generated by the sensor node and the anchor node may be present are described hereunder in more detail. For the description of the model the following notation is used: upper (lower) bold face letters are used to denote matrices (column vectors), while the expressions $(\cdot)^T$, $(\cdot)^H$, $(\cdot)^*$, $\odot$, $I_N$ and $0_N$ respectively represent transpose, Hermitian transpose, complex conjugate, element-wise Hadamard product, N×N identity matrix and N×1 vector of zeros. Furthermore, the expression $\widehat{(\cdot)}$ represents an estimate of a parameter, $\mathbb{E}(\cdot)$ represents an expectation operator and vec(·) represents a vector from a matrix by stacking the columns of the matrix.

Figure 2:
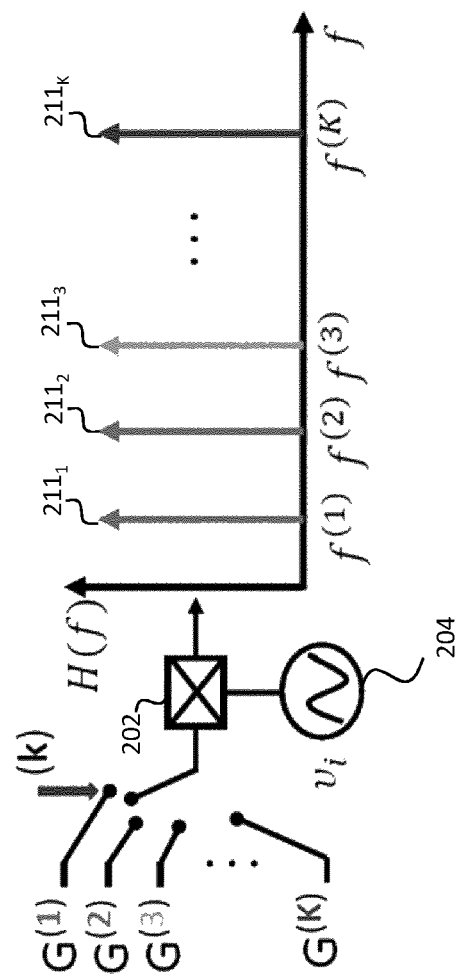
FIG. 2 schematically depicts an example of a frequency synthesizer.

FIG. 2 schematically depicts an example of a frequency synthesizer that may be used by wireless nodes of a wireless network. The frequency synthesizer is configured to generate a plurality of carrier frequencies and may be driven by a clock signal of a local oscillator 204. Modern radio transceivers support communication based on a number of carrier frequencies $f^{(k)}$ which may be selected by changing a gain $G^{(k)}$ of a divider in the frequency synthesizer. Typically, the carrier frequency $f^{(k)}$ may be much higher than the oscillator frequency $v_i$ of a wireless node i. For example, the oscillator frequency may be 33 MHz for a node with carrier frequencies $f^{(k)}$ between 2.4 GHz and 2.5 GHz.

In some embodiments, all the nodes may have the same or a similar frequency synthesizer with a set of K equispaced gains defined as $G^{(k)} = G^{(1)} + (k-1)\Delta G$, ($k=1, \ldots, K$), where $G^{(k)} \in \mathbb{Q}$ is the $k^{th}$ gain and $\Delta G$ is the step of the frequency divider. In that case, the frequency of the carrier signal, known as the carrier frequency, generated at the output of the frequency synthesizer for the $k^{th}$ gain may be given by $f_i^{(k)} = G^{(k)} v_i$ (i=0, 1). The set of all equispaced carrier frequencies supported by the frequency synthesizer can be written as:

$$\mathcal{F}_i = \{f_i^{(k)} = f_i^{(1)} + (k-1)\Delta f_i : \{f_i^{(1)}, \Delta f_i\} \in \mathbb{R}\}_{k=1}^{K} \quad (1)$$

where $\Delta f_i = \Delta G\, v_i$ (i=0,1) is the frequency step of the frequency synthesizer, and depends on the clock oscillator signal frequency $v_1$. For many wireless communication protocols, such as Bluetooth Low Energy (BLE), WiFi (IEEE 802.11) and ZigBee (IEEE 802.15.4), the step $\Delta f_i$ is much smaller than the lowest carrier frequency, e.g. $\Delta f_i$ may be 2 MHz or 5 MHz while $f_i^{(1)}$ may be 2.4 GHz. Communication standards for wireless networks such as Zigbee or Bluetooth, determine which carrier frequencies $f^{(k)}$ may be used. The carrier frequencies may be referred to as communication channels or frequency channels. Typically, slight variations of carrier frequencies in the order of e.g. +/–40 ppm may be allowed within a single channel. It is noted that FIG. 2 only depicts one example for generating carrier signals and other ways of generating carrier signals are also possible, which may not necessarily obey the above-mentioned expressions such as $f_i^{(k)} = G^{(k)} v_i$ or $\Delta f_i = \Delta G\, v_i$ (i=0, 1).

Figure 3:
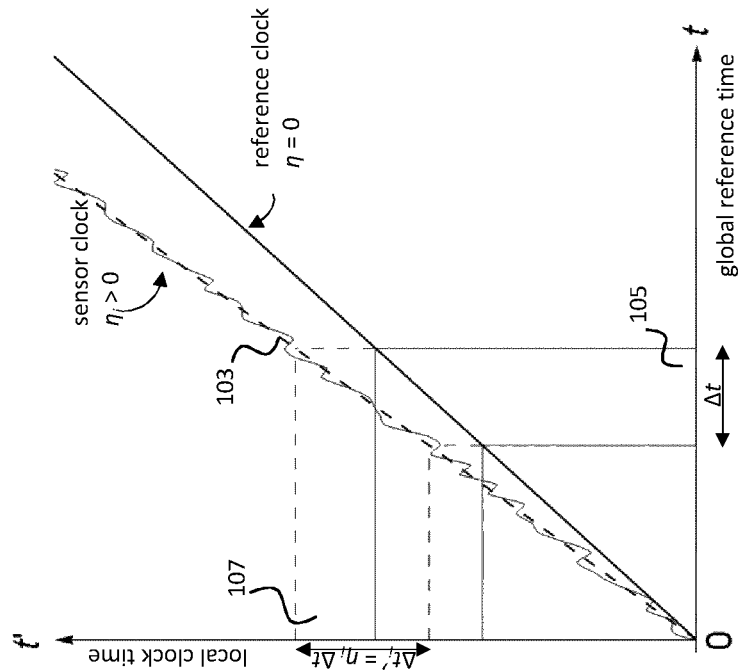
FIG. 3 illustrates the effect of a frequency offset between carrier signals of different wireless nodes.

FIG. 3 depicts a schematic graph showing the effect of a clock rate offset η between a local oscillator (a local clock) of a wireless sensor node and an ideal global reference oscillator (a reference clock). The horizontal axis of the graph represents the (global) reference time t of the reference clock, while the vertical axis represents the local clock time t' of the local clock. A normalized clock rate offset $\eta_i$ may be defined as $\eta_i = (\Delta t_i' - \Delta t)/\Delta t$. In the example depicted in FIG. 3, both clocks have the same time origin, i.e. t and t' are zero at the same moment in time. In such an example, the normalized clock rate offset η may be defined as the difference between the local time t' and the reference time, divided by the reference time t: $\eta_i = (t'-t)/t$. Equivalently, the local time t' may be written as $t' = (1+\eta_i) t$. In a more general case, there may be an additional offset due to non-coinciding origins; in such a case the local time t' may be written as $t' = t_0' + (1+\eta) t$ where $t_0' = t'(t=0)$. In the ideal case, the local time is equal to the reference time, i.e. η=0. For a local clock with a clock rate offset $\eta_i > 0$, the locally measured duration of a time interval $\Delta t_i'$ 307 is larger than the reference time interval $\Delta t$ 305. Similarly, for a local clock with a clock rate offset η<0, the locally measured duration of a time interval $\Delta t'$ is shorter than the reference time interval $\Delta t$. For a typical non-ideal local clock, the clock rate offset ti may be approximated by a constant, as shown by the dashed line 303.

Hence, in a wireless network, the clock behaviour of a sensor node may be described with reference to a node that has a relatively stable clock, which may function as a reference clock. This node may be referred to as an anchor node. In such case, the frequency of the local clock may be described based on a first-order affine clock model:

$$v_0 = v_1(1 + \eta_0), \quad (2)$$

wherein $\eta_0$ defines a normalized frequency offset of the sensor node relative to the anchor node, while $v_0$ and $v_1$ are the frequencies of the oscillator signals at the sensor and anchor node, respectively. Typically, the normalized frequency offset is small and expressed in terms of parts per million (ppm).

Figure 4B:
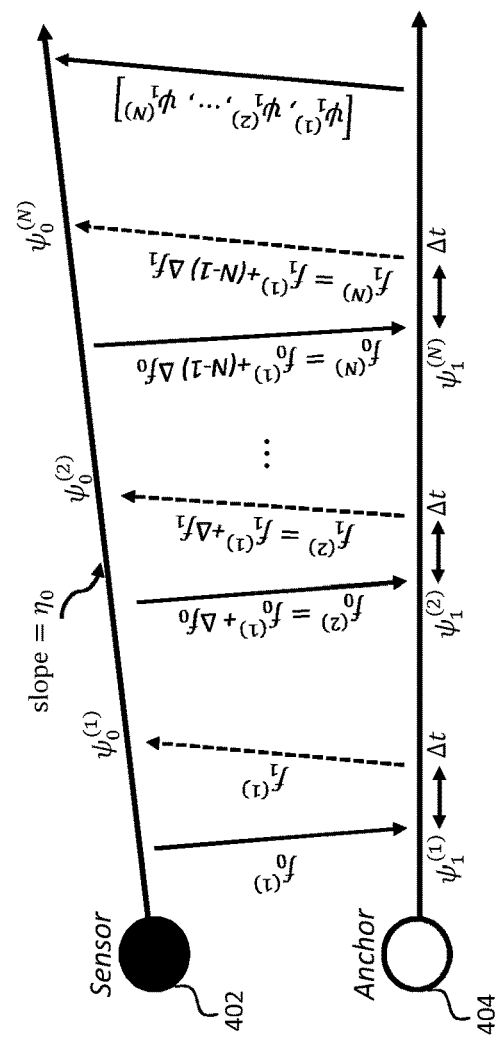
FIGS. 4A and 4B illustrate an example of a phase-based distance determination method.
Figure 4A:
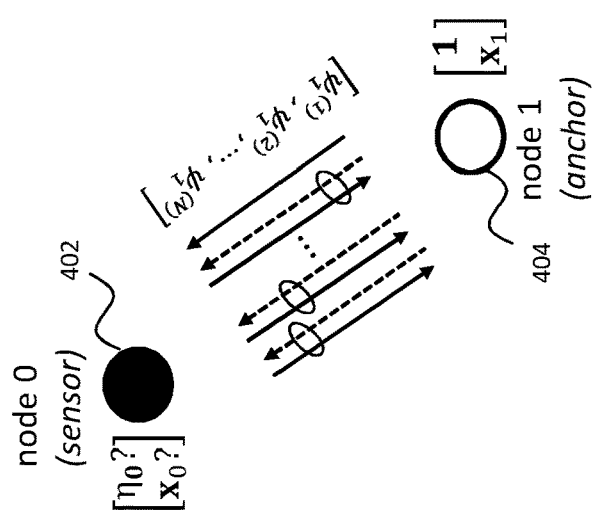

FIGS. 4A and 4B illustrate an example of a phase-based distance determination method. In particular, FIG. 4A depicts a sensor node 402 (node 0) and an anchor node 404 (node 1) in a radio network such as a wireless network. The nodes may be equipped with narrowband radio transceivers allowing two-way communication and phase detectors for determination of a phase difference between a phase of the received carrier signal and a phase of its own local carrier signal within one frequency channel. The sensor node and anchor node may be part of a (fully) asynchronous wireless radio network. The local time of the anchor node may be chosen as a reference time. The anchor node may be implemented as a reliable device with a relatively stable clock oscillator and a known position, while the sensor node may have an unknown position and a non-ideal oscillator with a frequency offset relative to the oscillator of the anchor node.

The nodes in FIG. 4A may execute a protocol wherein carrier signals of one frequency channel are exchanged between the sensor node and the anchor node. In contrast to the wireless nodes described with reference to FIG. 1, the exchange of carrier signals includes a single request signal (message) and a single response signal (message) for each frequency channel and a data message for transmitting phase information from the anchor node to the sensor node.

The sensor node may transmit a single tone unmodulated carrier signal at the $k^{th}$ carrier frequency:

$$s_0^{(k)}(t) = \Re\left\{\underline{s}_0 e^{j\left(2\pi f_0^{(k)} t + \varphi_0^{(k)}\right)}\right\}, \quad (3)$$

where $\underline{s}_0 \in \mathbb{R}$ is the amplitude of the complex envelope of $s_0^{(k)}(t)$ and $\varphi_0^{(k)}$ is an unknown phase offset introduced by the process of switching the carrier frequency.

The transmitted signal $s_0^{(k)}(t)$ is narrowband, and therefore, it is reasonable to consider flat-fading effects in the channel model. The signal received at the anchor node after propagation through the channel and down-conversion bye may be given by:

$$r_{01}^{(k)}(t) = \beta_{01}^{(k)} \underline{s}_0 e^{j\left(2\pi \mu_{01}^{(k)} t + \varsigma_{01}^{(k)}\right)} + n_1^{(k)}(t), \quad (4)$$

where $\beta_{01}^{(k)} \in \mathbb{C}$ is a complex path attenuation of the channel at $f_0^{(k)}$, $\mu_{01}^{(k)} = f_0^{(k)} - f_1^{(k)}$ and $\delta_{01}^{(k)} = \varphi_0^{(k)} - \varphi_1^{(k)}$ are unknown $k^{th}$ carrier frequency and phase offsets, respectively, while $n_1^{(k)}(t) \sim \mathcal{CN}(0, \sigma_1^2)$ denotes zero-mean complex Gaussian noise present at the anchor node. The complex path attenuation may be defined as $\beta_{01}^{(k)} = \alpha_{01}^{(k)} e^{-j2\pi f_0^{(k)} \tau_{01}}$ where $\beta_{01}^{(k)} \in \mathbb{R}_+$ is the channel attenuation, $\tau_{01} = d_{01}/c = d_{10}/c$ is an unknown path delay between sensor and anchor nodes spaced a distance $d_{01}$ apart and c is the known propagation speed of the radio signal. Using the frequency synthesizer model given in equation (1) and the clock model given in equation (2), the carrier frequency offset may be given by $\mu_{01}^{(k)} = \mu_{01}^{(1)} + (k-1)\Delta\mu_{01}$ where $\Delta\mu_{01} = \Delta f_1 \eta_0$.

FIG. 4B depicts a timing scheme of the protocol that is executed by the sensor and anchor nodes as described with reference to FIG. 4A. The scheme depicts the execution of a phase-based distance determination method, which may be referred to as the Phase Difference on Arrival (PDoA) protocol. As shown in FIG. 4B, the sensor node 402 may initiate the communication and send a signal $s_0^{(k)}(t)$ based on carrier frequency $f_0^{(k)}$ to the anchor node 404. The anchor node receives the signal as the signal $r_{01}^{(k)}$ and responds by transmitting a signal $s_1^{(k)}(t)$ based on reference carrier frequency $f_1^{(k)}$ to the sensor node. After the exchange of the signals, both nodes may change their carrier frequencies to $f_i^{(k+1)} = f_i^{(k)} + \Delta f_i$, $i=0,1$, and the same two-way signal exchange pattern is repeated. The phase differences, $\psi_0^{(k)}$ and $\psi_1^{(k)}$, at the $k^{th}$ carrier frequency are measured at both sensor and anchor nodes, respectively. Considering a noiseless case and assuming that channel reciprocity conditions hold (i.e., the received signals at anchor and sensor nodes differ only in sign of phase and frequency), equation (4) can be used to determine the following expressions of $\psi_0^{(k)}$ and $\psi_1^{(k)}$:

$$\psi_0^{(k)} = -2\pi\mu_{01}^{(k)}\Delta t - 2\pi f_1^{(k)}\tau_{01} - \delta_{01}^{(k)} \quad (5)$$
$$\psi_1^{(k)} = -2\pi f_0^{(k)}\tau_{01} + \delta_{01}^{(k)}$$

where $\Delta t$ is a deterministic time epoch between measurements collected at the anchor node and at the sensor node, while all other nondeterministic timing differences between the nodes are absorbed in $\delta_{01}^{(k)}$. In general, the time epoch $\Delta t$ may be controllable by the anchor node and this value may be in the order of tens of microseconds. In general, $\delta_{01}^{(k)}$ changes with each change in carrier frequency selection in an effectively random manner. In the PDoA protocol, it is generally assumed that $\Delta t$ is fixed during the recollection of the measurements.

The phase-based distance determination scheme described in this disclosure may be applied in indoor localization scenarios where the channel coherence time is typically of the order of several hundreds of milliseconds. In that case, it may be assumed that $N \leq K$ two-way messages have been exchanged within the channel coherence time. For the sake of simplicity, the N phase difference measurements recorded at sensor and anchor nodes may be transformed in their negative complex exponential form and collected in the vectors:

$$b_0 = \left[ e^{-j\psi_0^{(1)}}, \ldots, e^{-j\psi_0^{(N)}} \right]^T \in \mathbb{C}^{N \times 1},$$
$$b_1 = \left[ e^{-j\psi_1^{(1)}}, \ldots, e^{-j\psi_1^{(N)}} \right]^T \in \mathbb{C}^{N \times 1}.$$

For distance determination purposes, the phase offset $\delta_{01}^{(k)}$ represents a nuisance parameter which can be eliminated from the acquired measurements by considering $a = b_0 \odot b_1$ instead. The argument of the $k^{th}$ element in a is given by:

$$\arg\{a_k\} = 2\pi\mu_{01}^{(k)}\Delta t - 2\pi\left(f_1^{(k)} + f_0^{(k)}\right)\tau_{01}. \quad (6)$$

Using the frequency synthesizer model given in equation (1), the clock model given in equation (2), and the phase differences given in equation (5), the carrier frequency offset $\mu_{01}^{(k)}$ can be written as:

$$\mu_{01}^{(k)} = G^{(1)}\nu_1\eta_0 + (k-1)\eta_0\Delta f_1, \quad (7)$$
$$f_1^{(k)} + f_0^{(k)} = (2+\eta_0)\left(G^{(1)}\nu_1 + (k-1)\Delta f_1\right).$$

Therefore, the vector a has the model:

$$a(\tau_\eta) = a(\tau_\eta)\left[1, e^{j2\pi\Delta f_1 \tau_\eta}, \ldots, e^{j2\pi(N-1)\Delta f_1 \tau_\eta}\right]^T \quad (8)$$

where $a(\tau_\eta) = e^{j2\pi G^{(1)}\nu_1\tau_\eta}$ is the first element in $a(\tau_\eta)$ and $\tau_\eta = \eta_0\Delta t + (2+\eta_0)\tau_{01}$.

Note that under these assumptions, the vector $a(\tau_\eta)$ has a so-called shift invariant property. This property is similar to the shift invariant property of a uniform linear array (ULA) response vector which is known from the field of array signal processing wherein a group of sensors located at typically spatially separated points (a sensor array) are collecting data. Such sensor arrays and associated array signal processing techniques are typically used in radar, radio astronomy, sonar or seismic applications. However, in the considered case the phase shift of the elements in $a(\tau_\eta)$ is caused by equispaced carrier frequency switching, e.g. frequency hopping. Hence, in an embodiment, the shift invariant property of the vector a may be used to efficiently determine the path delay $\tau_{01}$ and the clock rate offset no based on the phase differences measured by the sensor and anchor node.

In a more general model, the frequency offset $\mu_{01}^{(k)}$ of carrier frequency k may be written as:

$$\mu_{01}^{(k)} = \left(f_0^{(k)} - f_1^{(k)}\right) = \eta_0^{(k)} f_1^{(k)}, \text{ where}$$
$$\eta_0^{(k)} = \frac{\left(f_0^{(k)} - f_1^{(k)}\right)}{f_1^{(k)}}$$

As was explained above with reference to the frequency synthesizer model of equation (1) and the clock model of equation (2), the normalized offset $\eta_0^{(k)}$ may be considered constant over the k different carrier frequencies in many applications. Hence, in some embodiment, $\eta_0^{(k)}$ may be written as $\eta_0$. In other embodiments, where $\eta_0^{(k)}$ may not be considered constant over k, a parameter $\tau_\eta^{(k)}$ may be defined:

$$\tau_\eta^{(k)} = \eta_0^{(k)}\Delta t + \left(2+\eta_0^{(k)}\right)\tau_{01},$$

in that case however vector a loses its shift invariant property.

In PDoA protocols known in the prior art, the contribution of the frequency offset $\mu_{01}^{(k)}\Delta t=(f_0^{(k)}-f_1^{(k)})\Delta t=\eta_0^{(k)}f_1^{(k)}\Delta t$ to the phase difference, resulting from the difference in carrier frequency between the sensor node and the anchor node within the same frequency channel, is not taken into account. This results in an error in the determined phase difference, and hence in the determined path delay, and hence in an error in the determined distance.

The shift invariance of $a(\tau_\eta)$ only allows for the determination of a single parameter $\tau_\eta$, but not the separate contributions due to $\eta_0\Delta t$ and $(2+\eta_0)\tau_{01}$, respectively. Hence, $\eta_0$ and $\tau_{01}$, (and thus $d_{01}$) cannot be uniquely determined based on $a(\tau_\eta)$. For example, determination of the $\tau_{01}$ from $a(\tau_\eta)$ results in an estimate that is biased by the frequency offset. In other words, the protocol described with reference to FIGS. 4A and 4B does not enable a sensor node to accurately determine a distance under the condition that small frequency offsets between the sensor and anchor nodes exist. In order to solve this problem, phase difference measurements over a 2D set of time instances (time epochs) and carrier frequencies are determined and processed. Preferably, both the carrier frequencies and the time epochs are equidistant, as will be explained below in more detail.

Figure 5B:
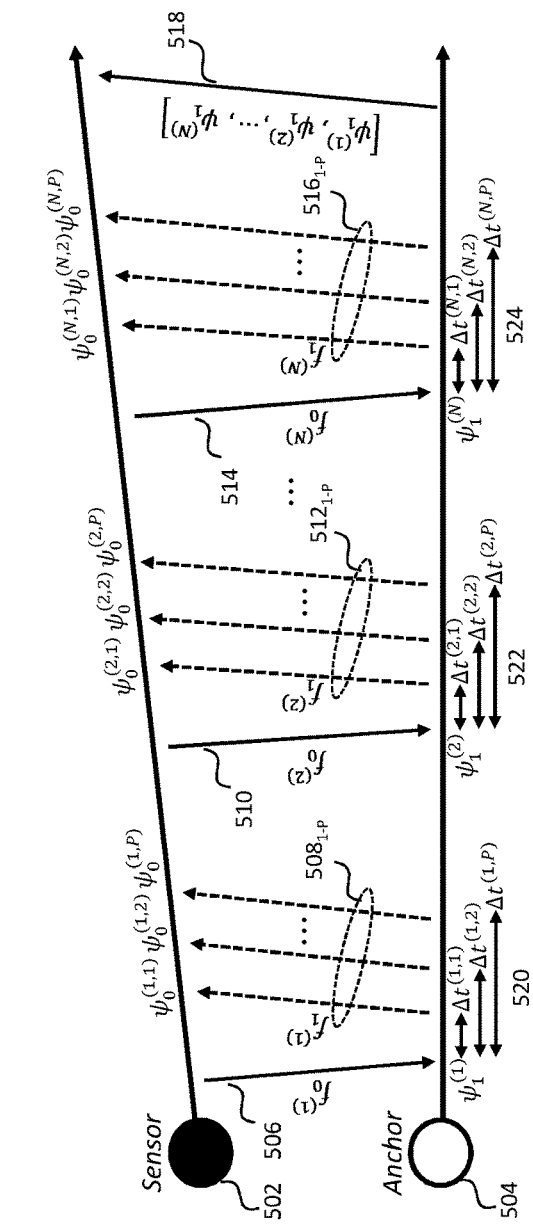
FIGS. 5A and 5B illustrate a phase-based distance determination method according to embodiments of the invention.
Figure 5A:
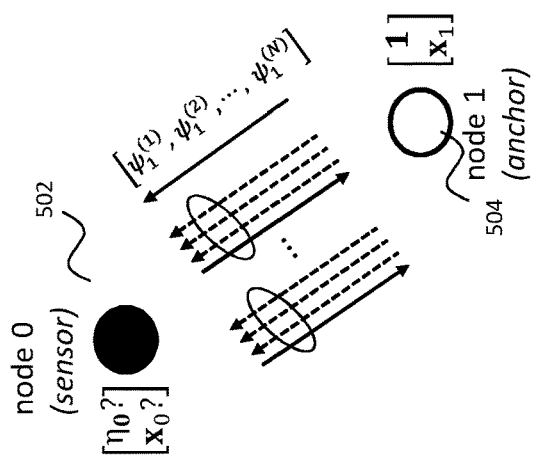

FIGS. 5A and 5B illustrate a phase-based distance determination method according to an embodiment of the invention. In particular, FIGS. 5A and 5B illustrate a scheme wherein for each frequency channel a sensor node 502 transmits a single request signal 506,510,514 while the anchor node 504 transmits P, (P>1) response signals 508$_{1-P}$, 512$_{1-P}$, 516$_{1-P}$ based on equispaced time epochs 520,522, 524. Thus, for each frequency channel k (k=1, N; N>1), the sensor node 502 sends a request signal at carrier frequency $f_0^{(k)}$ of the sensor node and receives P response signals 508$_{1-P}$, 512$_{1-P}$, 516$_{1-P}$ at a reference carrier frequency $f_1^{(k)}$ of the anchor node. In the embodiment shown in FIG. 5, the sensor node may initiate the transmission of the request signal, but in other embodiments, the anchor node may first send P signals to the sensor node, followed by a single response signal from the sensor node to the anchor node.

In an embodiment, the set of the equispaced time epochs for the $k^{th}$ carrier frequency may be given by the expression: $\Delta t^{(k,p)}=p\Delta t/k$, wherein k=1, . . . , N and p=1, . . . , P and $\Delta t$ is a fixed, predetermined time epoch; that is, the time interval between two subsequent response messages may be given by $\Delta t/k$. Thus, in this embodiment, the time epochs depend on the index k of the carrier frequency $f_i^{(k)}$. In other embodiments, another expression for the time epochs may be chosen.

For each frequency channel k, the sensor node records, for each of the P received response signals of carrier frequency $f_1^{(k)}$, a phase difference measurement $\psi_0^{(k,p)}$ (k=1, . . . , N; p=1, . . . , P) between the received signal and the local carrier signal having a carrier frequency $f_0^{(k)}$. In an embodiment, these phase difference measurements may be transformed into their negative complex exponential form $e^{-j\psi_0(k,p)}$ and collected in a vector $b_k \in \mathbb{C}^{P\times 1}$. Similarly, for each frequency channel k, the anchor node may measure a phase difference measurement $\psi_1^{(k)}$ between the received signal of frequency $f_0^{(k)}$ and the local carrier signal having carrier frequency $f_1^{(k)}$. In an embodiment, these phase difference measurements are transformed in their negative complex exponential form $e^{-j\psi_1(k)}$.

In the embodiment depicted in FIGS. 5A and 5B the sensor node performs the frequency offset and distance determination, and therefore the anchor node sends a signal 518 comprising N phase measurements $\psi_1^{(k)}$ to the sensor node. In different embodiments the sensor node may send the phase difference measurements $\psi_0^{(k,p)}$ to the anchor node. In some embodiments, the anchor node may send a separate signal comprising $\psi_1^{(k)}$ for each individual carrier frequency k. In some embodiments, both the sensor node and the anchor node may send the phase measurements $\psi_0^{(k,p)}$, respectively $\psi_1^{(k)}$, to a third device which is configured to determine the frequency offset and the distance between the sensor and anchor node.

Analogous to the elimination of the nuisance parameters or phase offsets $\delta_{01}^{(k)}$ as described above with references to FIGS. 4A and 4B, the phase differences $\psi_1^{(k)}$ and $\psi_0^{(k,p)}$ may be combined into $\psi^{(k,p)}=\psi_1^{(k)}+\psi_0^{(k,p)}$ or $e^{-j\psi(k,p)}=e^{-j\psi_0(k,p)}\cdot e^{-j\psi_1(k)}$. The noiseless phase difference measurements recorded at the $k^{th}$ carrier frequency may be collected in a vector that may be written as $a_k=e^{-j\psi_1(k)}b_k\in \mathbb{C}^{P\times 1}$ which satisfies the model:

$$a_k(\eta_0, \tau_{01}) = a(\tau_\eta)\gamma^{k-1}[1, \phi, \ldots, \phi^{P-1}]^T, \quad (9)$$

$$\gamma = e^{j2\pi\Delta f_1(2+\eta_0)\tau_{01}} \text{ and } \phi = e^{j2\pi\Delta f_1\eta_0\Delta t}.$$

wherein $a(\tau_\eta)$ is defined following equation (8), and wherein

The path delay $\tau_{01}$ and the frequency offset $\eta_0$ may then be determined from the N vectors $a_k$ as will be explained below with reference to FIG. 7.

Equation (9) is valid under the assumption that $\eta_0$ is approximately constant for all k and p, and that the time epochs are chosen to be equispaced according to $\Delta t^{(k,p)}=p\Delta t/k$. In a more general embodiment, $\eta_0^{(k)}$ may be determined for each frequency $f_0^{(k)}$, using a similar data gathering protocol, but possibly adjusted data processing. As P>1, $\eta_0^{(k)}$ may be determined for each k, based on the P phase difference measurements $\psi^{(k,p)}$. After determination of $\eta_0^{(k)}$, $\tau_{01}$ may be determined from the N measurements via $\tau_\eta^{(k)}=\eta_0^{(k)}\Delta t+(2+\eta_0^{(k)})\tau_{01}$.

The protocol depicted in FIGS. 5A and 5B requires that during message exchange for one frequency channel no carrier frequency switching occurs. This constraint ensures that the initial phase offset between two nodes remains constant during time hopping. However, there is no constraint on the frequency hopping sequence. This makes the proposed protocol attractive for implementation as an adaptation of existing medium access control protocols such as time-slotted channel hopping (TSCH) or WirelessHART. As many widely used wireless communication standards perform phase estimation, the protocols described in this disclosure could easily be implemented in any such standard. For example, the methods described herein could be implemented on top of WiFi (IEEE 802.11 a/g/b/ac/ah/n/p), Bluetooth, or ZigBee (IEEE 802.15.4). The method may advantageously be combined with standards implementing frequency hopping as part of the communication protocol, such as Bluetooth or Bluetooth Low Energy. A version of the protocol may also be implemented in e.g. SigFox or LoRa networks, although in these standards, there may be limits on the number of messages that may be exchanged per unit time, for instance due to current radio regulations.

Figure 6:
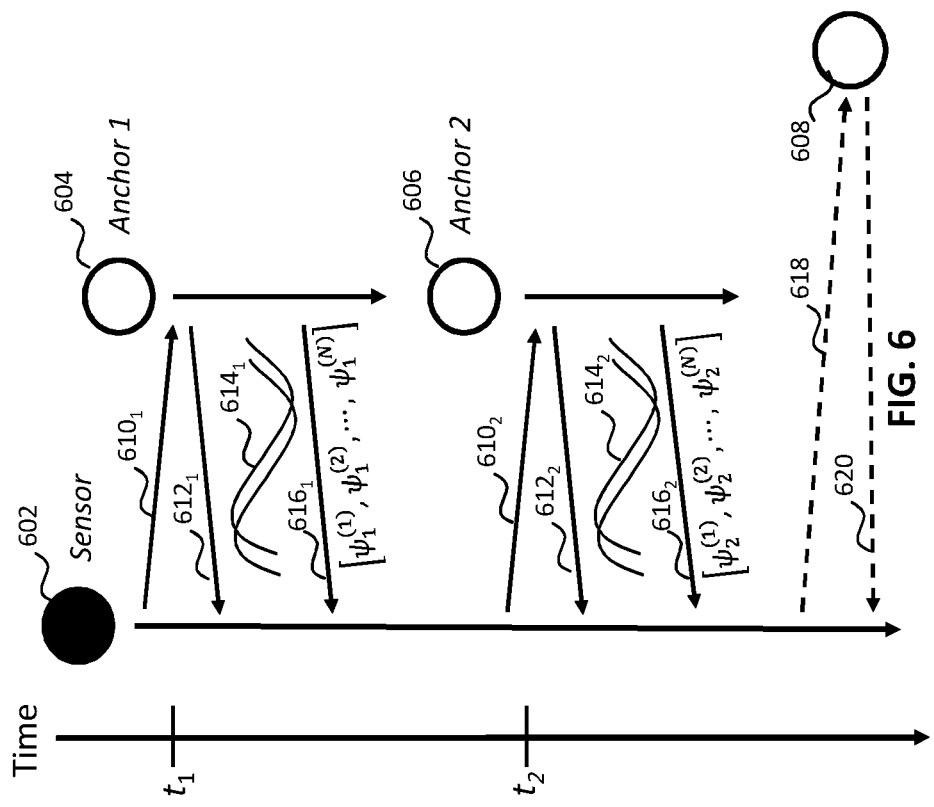
FIG. 6 depicts a timing diagram for phase-based distance determination according to embodiments of the invention.

FIG. 6 depicts a timing diagram for phase-based distance determination according to an embodiment of the invention. A sensor node 602 sends a ranging intent signal 610$_1$ to a first anchor node 604, that responds with an acknowledgement signal 612$_1$. The sensor node and anchor node then execute a phase-based distance determination protocol according to an embodiment of the invention, e.g. the protocol described above with reference to FIGS. 5A and 5B, ending with the sensor node receiving a message comprising phase information $616_1$ from the anchor node. The sensor node may then repeat these steps with a second anchor node 606, and possibly additional anchor nodes. The sensor node and the anchor nodes may communicate on the basis of a known communication standard, e.g. WiFi (IEEE 802.11 a/g/b/ac/ah/n/p), Bluetooth, or ZigBee (IEEE 802.15.4) or any further development or extension of these standards or standards that are suitable for IoT applications, and the messages exchanged between the sensor node and anchor nodes may have a format as prescribed by such standards.

In an embodiment, the sensor node may determine distances to the anchor nodes, and, based on known positions of the anchor nodes and the determined distances, determine its own position. Optionally, the sensor node may transmit a message 618 comprising the computed position to a device 608. Device 608 may be one of the anchor nodes 604,606 or a different device, e.g. a monitoring device. In a different embodiment, the sensor node may only determine distances to the anchor nodes, and transmit a message comprising the determined distances to device 608, which may subsequently determine a position of the sensor node. Optionally, the device 608 may transmit a message 620 comprising the determined position to the sensor node. In yet a different embodiment, the sensor node may send a message comprising the determined and received phase information to device 608. Based on the phase information, the device 608 may determine the position of the sensor node. Optionally, the device 608 may transmit a message comprising the determined position to the sensor node.

Hereunder, an efficient computation of an estimate of the frequency offset $\eta_0$ and distance (e.g. in the form of a transit time $\tau_{01}$) based on the collected phase difference measurements $\psi^{(k,p)}$ or $e^{-j\psi^{(k,p)}}$ is described. In this embodiment, the frequencies and time epochs are equispaced and the frequency offsets for the frequency channels are approximately equal (i.e. $\eta_0^{(k)} = \eta_0$).

Figure 7:
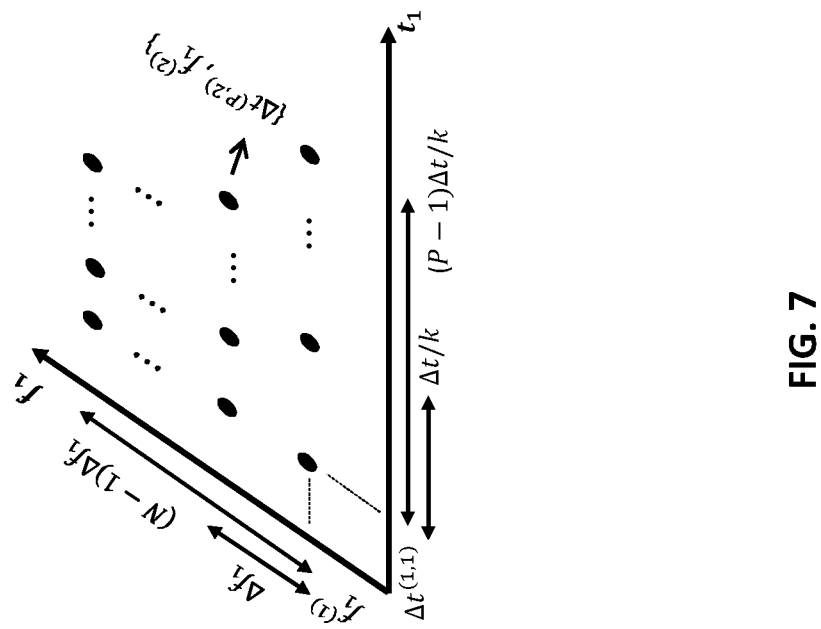
FIG. 7 depicts a 2D equidistant time-frequency grid which is used by a wireless sensor device according to embodiments of the invention.

FIG. 7 depicts a 2D equidistant time-frequency grid which is used by a wireless sensor device according to an embodiment of the invention. The time intervals $\Delta t^{(n,p)}$ may only be equispaced related to a carrier frequency n (i.e. $\Delta t^{(n,p)}$ may be equispaced for fixed n and p=1, ..., P), while the set of time instances may not be equispaced with respect to different carrier frequencies (i.e. $\Delta t^{(n,p)}$ may be equispaced for fixed p and n=1, ..., N). Phase difference measurements, preferable combined phase difference measurements $\psi^{(n,p)}$ or $e^{-j\psi^{(n,p)}}$, are schematically drawn as dots in a 2D time-frequency grid. Each dot may be displaced from its ideal location due to noise. The problem of determining the frequency offset $\eta_0$ and the path delay $\tau_{01}$ is then mathematically equivalent to finding the two vectors that generate the grid as depicted in FIG. 7. A method for finding these vectors is described below.

The noise-corrupted version of the vector $a_k$ is given by $m_k = a_k + n_k$, where $n_k$ is a zero-mean complex Gaussian distributed noise vector (while the phase determination errors in the phase-locked loops (PLLs) are Thikonov (von Mises) distributed, for large signal to noise ratio, the Thikonov distribution can be approximated by a Gaussian distribution). From a set of N noisy 2D phase difference measurements as described with reference to FIGS. 5A and 5B, a measurement matrix M of size P×N can be constructed as:

$$M = [m_1, \ldots, m_N]. \tag{10}$$

The measurement matrix M satisfies the model:

$$M = A + N \tag{11}$$

where $A = [a_1, \ldots, a_N]$ and $N \in \mathbb{C}^{P \times N}$ is the noise matrix. Using equation (9), it is straightforward to show that A can be modelled as:

$$A = q(\eta_0, \tau_{01}) h^T(\eta_0, \tau_{01}), \tag{12}$$

where $$q = a(\tau_\eta)[1, \phi, \ldots, \phi^{P-1}]^T \tag{13}$$

$$h = [1, \gamma, \cdots, \gamma^{N-1}]^T.$$

Model (11), using relation (12), resembles the signal model for 2D frequency determination of a single complex sinusoid in white Gaussian noise. This is a classical signal processing problem for which numerous methods have been proposed. Although the maximum likelihood estimator proposed in M. P. Clark and L. L. Scharf, '*Two-dimensional model analysis based on maximum likelihood*', IEEE Transactions of Signal Processing 42:6 (1994) pages 1443-1452, can attain optimum performance, it has high computational requirements due to the multidimensional search. Here, a suboptimal but computationally more attractive (practical) method is proposed. To do so, an algorithm for joint determination of frequency offset $\eta_0$ and path delay $\tau_{01}$ is developed.

From equation (12), it may be observed that A has rank one and that the vectors q and h span its column and row space, respectively. Since q and h exhibit shift invariance, it is possible to estimate $\gamma$ and $\phi$ from the low-rank approximation of M. Then, from $\phi$ and $\gamma$, the parameters $\eta_0$ and $\tau_{01}$, and hence $d_{01}$, immediately follow.

In particular, let $u_1$ and $v_1$ be the principal orthonormal basis vectors for the column and row span of the rank-one approximation of M, respectively. These vectors can be obtained using the singular value decomposition (SVD) of M and can be expressed as:

$$u_1 = 1/\rho_q q, \quad v_1 = 1/\rho_h h^*, \tag{14}$$

where $\rho_a$ and $\rho_h$ are unknown complex constants. Now, let define the selection matrices $J_{\phi 1}$, $J_{\phi 2}$, $J_{\gamma 1}$, and $J_{\gamma 2}$ may be defined as:

$$J_{\phi 1} = [I_{P-1} \ 0_{P-1}], \quad J_{\gamma 1} = [I_{N-1} \ 0_{N-1}], \tag{15}$$

$$J_{\phi 2} = [0_{P-1} \ I_{P-1}], \quad J_{\gamma 2} = [0_{N-1} \ I_{N-1}].$$

To estimate $\phi$, subvectors $u_{\phi 1}$ and $u_{\phi 2}$ comprising the first and, respectively, the last P−1 elements of the $u_1$ may be taken; that is, $u_{\phi 1}$ and $u_{\phi 2}$ may be defined as $u_{\phi 1} = J_{\phi 1} u_1$ and $u_{\phi 2} = J_{\phi 2} u_1$, respectively. The same process may be followed for the determination of $\gamma$, i.e. subvectors $v_{\gamma 1}$ and $v_{\gamma 2}$ may be defined as: $v_{\gamma 1} = J_{\gamma 1} v_1$ and $v_{\gamma 2} = J_{\gamma 2} v_1$, respectively. From the shift invariance property of $u_1$ and $v_1$, it follows that:

$$u_{\phi 2} \approx u_{\phi 1} \phi \text{ and } v_{\gamma 2} \approx v_{\gamma 1} \gamma^*. \tag{16}$$

In the case of white noise, the approximate solutions equations (16) can be found using least squares (LS). However, the weighted least squares (WLS) approach may be used so that equations (16) may be formulated as follows:

$$\hat{\phi} = \underset{\phi}{\operatorname{argmin}} \| C_\phi^{-1/2}(u_{\phi 1}\phi - u_{\phi 2}) \|_2^2 \quad (17)$$

$$\hat{\gamma} = \underset{\gamma}{\operatorname{argmin}} \| C_\gamma^{-1/2}(v_{\gamma 1}\gamma - v_{\gamma 2}) \|_2^2$$

where $C_\phi = \mathbb{E}(r_\phi r_\phi^H)$ and $C_\gamma = \mathbb{E}(r_\gamma r_\gamma^H)$ are the covariance matrices of the residuals $r_\phi = u_{\phi 1}\phi - u_{\phi 2}$ and $r_\gamma = v_{\gamma 1}\gamma^+ - v_{\gamma 2}$, respectively. Therefore, the weighting matrices are the inverse of the covariance of the residuals, i.e. $W_\phi = C_\phi^{-1}$ and $W_\gamma = C_\gamma^{-1}$. The optimal $W_\phi$ and $W_\gamma$ for the considered problem are given in closed-form by:

$$W_\phi[p,n] = (P\min(p,n) - pn)\phi^{(p-n)}/P \quad (18)$$

$$W_\gamma[p,n] = (N\min(p,n) - pn)\gamma^{(n-p)}/N,$$

where $p=1,\ldots,P$ and $n=1,\ldots,N$. Note that $W_\phi$ and $W_\gamma$ depend on the unknown parameters $\phi$ and $\gamma$. Therefore, $\phi$ and $\gamma$ are first estimated using LS and then these estimates are used for construction of $W_\phi$ and $W_\gamma$. Finally, the WLS is used to obtain $\hat{\phi}$ and $\hat{\gamma}$. Based on the WLS estimates of $\phi$ and $\gamma$ the unknown parameters are computed as:

$$\hat{\eta}_0 = (2\pi\Delta f_1 \Delta t)^{-1} \arg(\hat{\phi}) \quad (19)$$

$$\hat{\tau}_{01} = (2\pi\Delta f_1 \Delta t(2+\hat{\eta}_0))^{-1}\arg(\hat{\gamma})$$

$$\hat{d}_{01} = c\hat{\tau}_{01}.$$

Note that first the frequency offset $\hat{\eta}_0$ may be estimated and this estimate may be used for the estimate of the path delay $\hat{\tau}_{01}$ and the distance $\hat{d}_{01}$.

The performance of the proposed estimators (19) may be assessed by deriving the Cramér Rao Lower Bound (CRLB) for joint frequency offset and distance determination using the model (11). For an unbiased estimator $\hat{\theta}$, the CRLB is the lower bound on the error variance, that is:

$$\operatorname{var}(\hat{\theta}) \geq F^{-1} \quad (20)$$

where $\operatorname{var}(\hat{\theta}) = \mathbb{E}((\hat{\theta}-\theta)(\hat{\theta}-\theta)^T)$ and F is the Fisher information matrix. We assume that the proposed estimators (19) are approximately unbiased for sufficiently large SNR and well-designed measurement matrix M.

In the case of 2-D frequency determination of the sum of the complex sinusoids, the Fisher information matrix is given by:

$$F_{p,k} = 2\sigma^{-2} \Re\left[\frac{\partial a^H}{\partial \theta_p} \frac{\partial a}{\partial \theta_k}\right] \in \mathbb{R}^{2\times 2} \quad (21)$$

where $F_{p,k}$ is the $(p,k)^{th}$ element of F, $\sigma^2$ is the variance of the noise, $\partial/\partial\theta_p$ is the partial derivative with respect to the $p^{th}$ element of $\theta$, $a = \operatorname{vec}(A) \in \mathbb{C}^{PN\times 1}$ is the vector formed by stacking the columns of A. The resulting Fisher information matrix is invertible, so closed-form expressions for the CRLBs are given by:

$$\operatorname{var}(\hat{\eta}_0) \geq \frac{6}{SNR(2\pi\Delta f_1\Delta t)^2 PN(P^2-1)}, \quad (22)$$

$$\operatorname{var}(\hat{d}_{01}) \geq \frac{6c^2}{SNR(4\pi\Delta f_1)^2 PN(N^2-1)}.$$

where $SNR = \sigma^{-2}$.

In the following, simulations are used to compare the performance of the proposed protocol and algorithm with state-of-the-art estimators for the same problem. We consider two nodes, i.e. anchor and sensor, which are deployed randomly within a distance of 140 m. The carrier frequency step $\Delta f_i$ (i=0,1) and time epoch $\Delta t$ are set to 0.5 MHz and 80 μs, respectively. The frequency offset of the sensor node $\eta_0$ is set to 80 ppm. The phase differences of arrival measurements are corrupted with zero-mean Gaussian noise and all results presented are averaged over $10^3$ independent Monte Carlo runs.

Figure 8B:
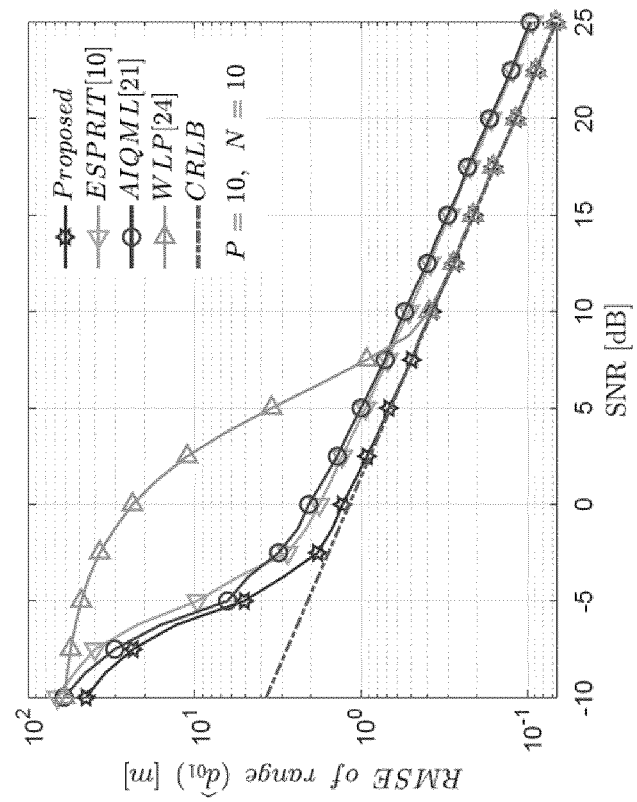
FIGS. 8A and 8B depict the Root Mean Square Error (RMSE) of estimated frequency offset $\eta_0$ against the signal to noise ratio (SNR) for a fixed number of two-way message exchanges.
Figure 8A:
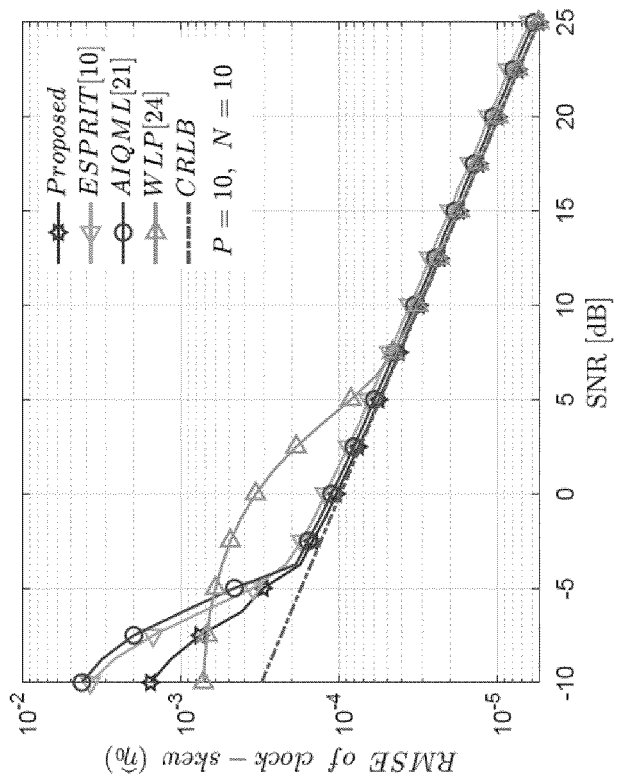

FIGS. 8A and 8B show the root mean square error (RMSE) of estimated frequency offset $\hat{\eta}_0$ and estimated distance $\hat{d}_{01}$ against the signal-to-noise ratio (SNR) for various estimators. The number of time hops P and frequency hops N is equal and set to 10. All the algorithms are independently applied to the same set of PDoA measurements. As shown in the figures, the proposed algorithm outperforms the approximate iterative quadratic maximum-likelihood (AIQML), weighted linear predictor (WLP) and ESPRIT for both estimated frequency offset $\hat{\eta}_0$ and estimated distance $\hat{d}_{01}$. Furthermore, for sufficiently high SNR the proposed algorithm is asymptotically efficient and approaches the theoretical bounds, i.e. the CRLB.

Figure 9B:
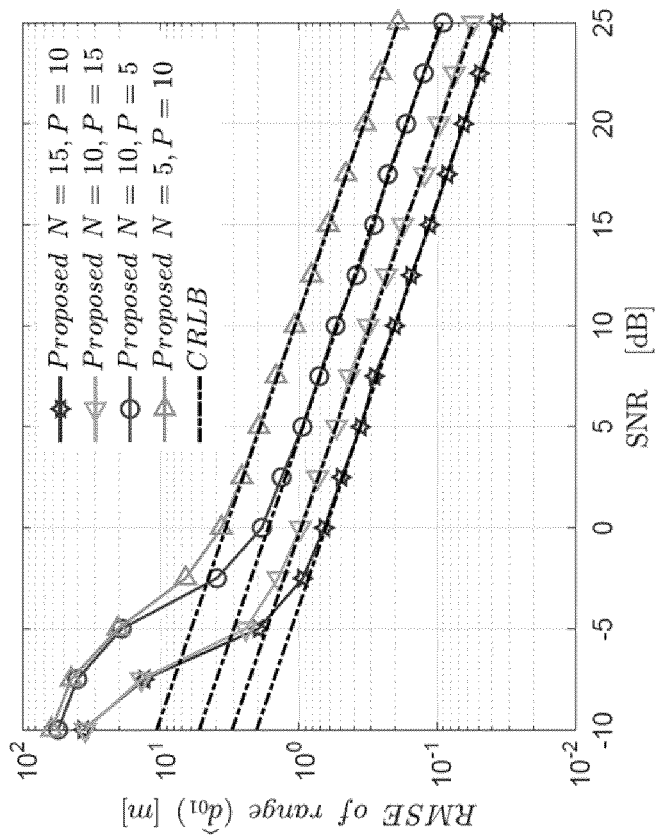
FIGS. 9A and 9B depict the Root Mean Square Error (RMSE) of estimated frequency offset $\eta_0$ and distance $d_{01}$ against the signal to noise ratio (SNR) for PDoA measurements collected over a varying number of time epochs (P) and carrier frequencies (N)
Figure 9A:
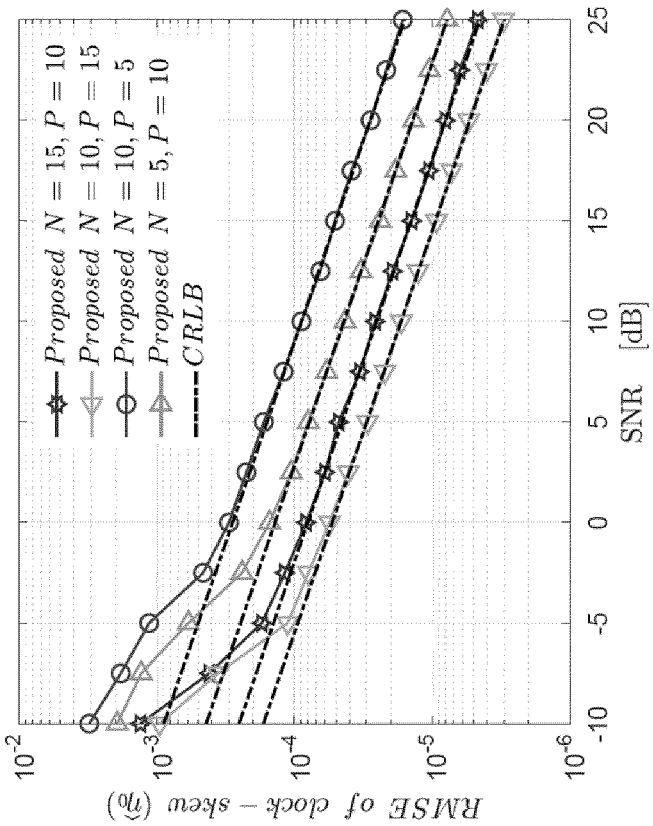

FIGS. 9A and 9B show the RMSE of estimated frequency offset $\hat{\eta}_0$ and estimated distance against the SNR for a different number of PDoA measurements collected over time epochs (P) and carrier frequencies (N). It is shown that by increasing the number of PDoA measurements collected over time epochs the accuracy of the frequency offset estimates $\hat{\eta}_0$ is increased, while the accuracy of the distance estimates $\hat{d}_{01}$ increases with N.

Figure 10B:
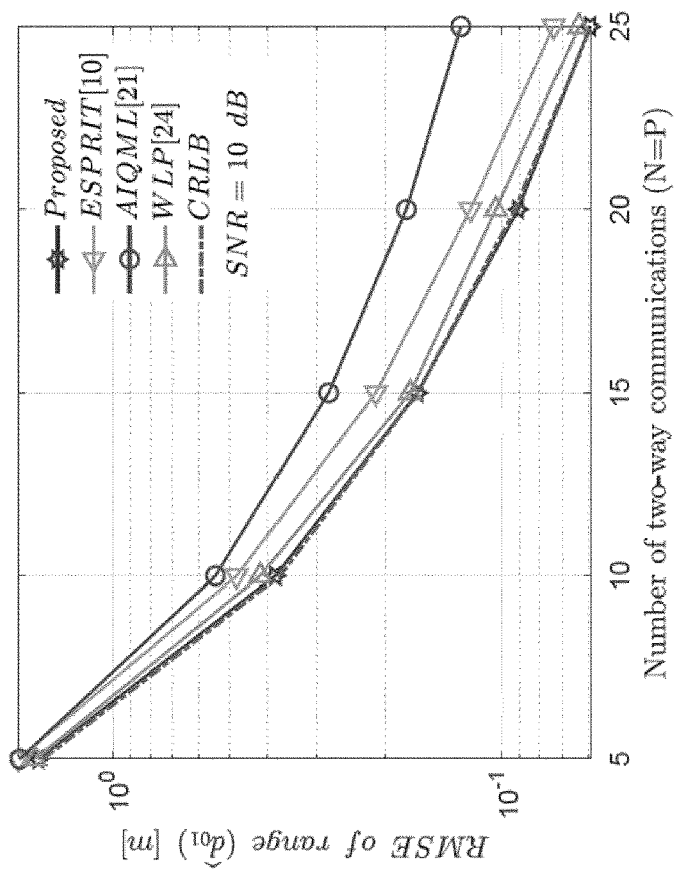
FIGS. 10A and 10B depict the RMSE of estimated distance $d_{01}$ versus number of two-way message exchanges for a fixed signal to noise ratio (SNR)
Figure 10:
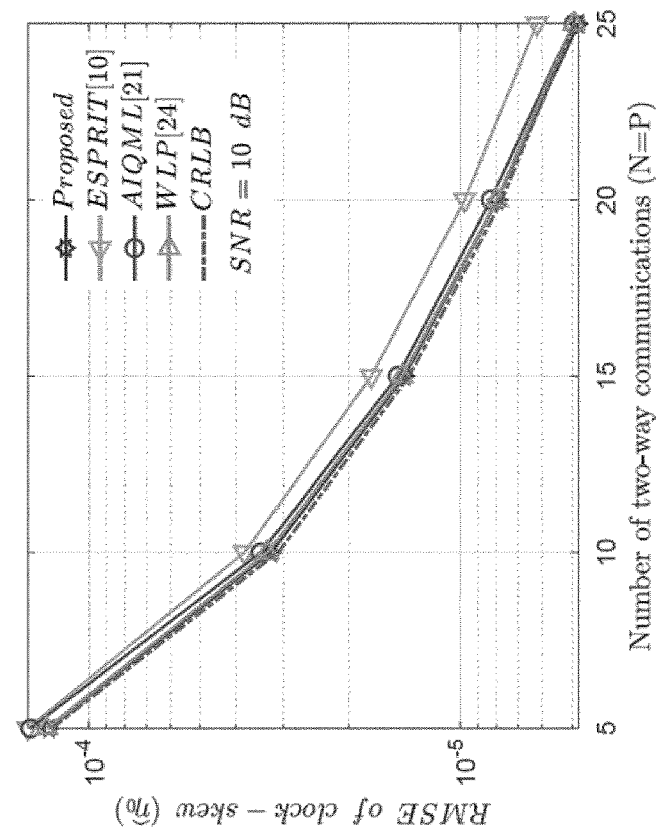

FIGS. 10A and 10B show the RMSE of estimated frequency offset $\hat{\eta}_0$ and estimated distance $\hat{d}_{01}$ against the number of PDoA measurements, while SNR is set to 10 dB. In all scenarios the number of time and frequency hops is equal. Similar as in the previous scenarios, the proposed algorithm outperforms AIQML, WLP and ESPRIT. In addition, it can be seen that the proposed estimator achieves the CRLB.

Figure 11:
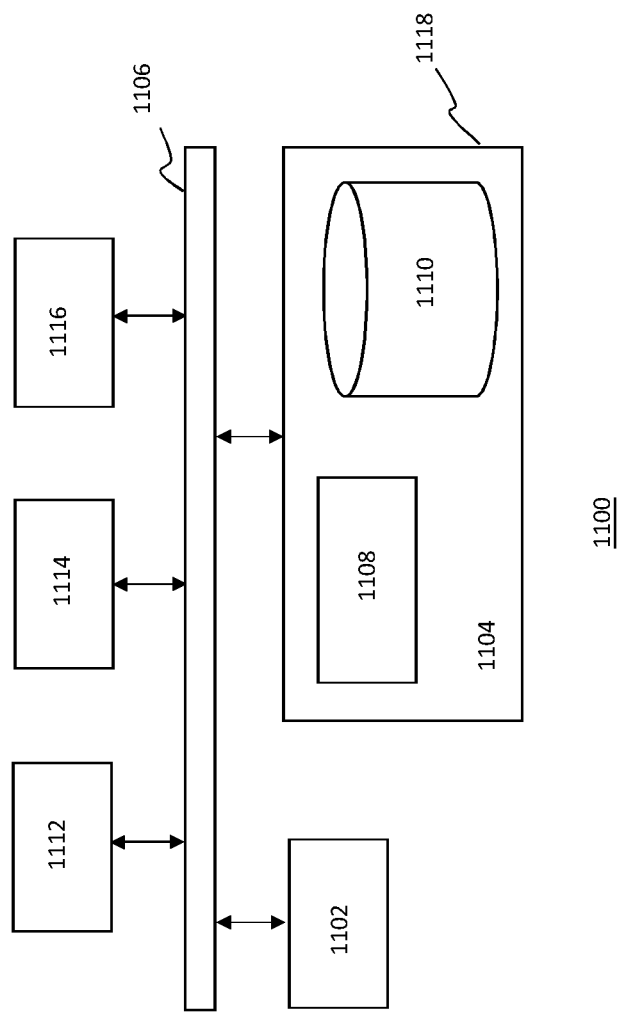
FIG. 11 is a block diagram illustrating an exemplary data processing system that may be used for executing methods and software products described in this disclosure.

FIG. 11 is a block diagram illustrating an exemplary data processing system that may be used in as described in this disclosure. Data processing system 1100 may include at least one processor 1102 coupled to memory elements 1104 through a system bus 1106. As such, the data processing system may store program code within memory elements 1104. Further, processor 1102 may execute the program code accessed from memory elements 1104 via system bus 1106. In one aspect, data processing system may be implemented as a computer that is suitable for storing and/or executing program code. It should be appreciated, however, that data processing system 1100 may be implemented in the form of any system including a processor and memory that is capable of performing the functions described within this specification.

Memory elements 1104 may include one or more physical memory devices such as, for example, local memory 1108 and one or more bulk storage devices 1110. Local memory may refer to random access memory or other non-persistent memory device(s) generally used during actual execution of the program code. A bulk storage device may be implemented as a hard drive or other persistent data storage device. The processing system 1100 may also include one or more cache memories (not shown) that provide temporary storage of at least some program code in order to reduce the number of times program code must be retrieved from bulk storage device 1110 during execution.

Input/output (I/O) devices depicted as input device 1112 and output device 1114 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1116 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1100.

As pictured in FIG. 11, memory elements 1104 may store an application 1118. It should be appreciated that data processing system 1100 may further execute an operating system (not shown) that can facilitate execution of the application. Application, being implemented in the form of executable program code, can be executed by data processing system 1100, e.g., by processor 1102. Responsive to executing application, data processing system may be configured to perform one or more operations to be described herein in further detail.

In one aspect, for example, data processing system 1100 may represent a client data processing system. In that case, application 1118 may represent a client application that, when executed, configures data processing system 1100 to perform the various functions described herein with reference to a "client". Examples of a client can include, but are not limited to, a personal computer, a portable computer, a mobile phone, or the like.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for determining a distance and/or a frequency offset between a first node and a second node in a wireless network, the method comprising:

the first node transmitting a first request message based on a first carrier signal to the second node and receiving a plurality of first response messages from the second node, the plurality of first response messages being transmitted based on a first reference carrier signal by the second node to the first node;

the first node transmitting a second request message based on a second carrier signal to the second node and the first node receiving a plurality of second response messages from the second node, the plurality of second response messages being transmitted based on a second reference carrier signal by the second node to the first node;

the first node receiving a first phase difference and second phase difference from the second node, the first phase difference defining a difference between a phase of the first carrier signal and a phase of the first reference carrier signal at a predetermined time instance associated with the first request message and the second phase defining a difference between a phase of the second carrier signal and a phase of the second reference carrier signal at a predetermined time instance associated with the second request message;

the first node determining a set of third phase differences and a set of fourth phase differences based on the plurality of first response messages and the plurality of second response messages respectively, each of the set of third phase differences defining a difference between a phase of the first reference carrier signal and a phase of the first carrier signal at a predetermined time instance associated with one of the plurality of first response messages; and, each of the set of fourth phase differences defining a difference between a phase of the second reference carrier signal and a phase of the second carrier signal at a predetermined time instance associated with one of the plurality of second response messages; and, optionally, the first node and/or the second node or a further node determining a distance and/or a frequency offset between the first node and the second node based on the first and second phase difference and the set of third and fourth phase differences.

2. Method according to claim 1 wherein the first carrier signal is associate with a first carrier frequency and the first reference carrier signal is associated with a first reference carrier frequency, the first carrier frequency and the first reference carrier frequency forming a first frequency channel between the first node and the second node and wherein second carrier signal is associate with a second carrier frequency and the second reference carrier signal is associated with a second reference carrier frequency, the second carrier frequency and the second reference carrier frequency forming a second frequency channel between the first node and the second node.

3. Method according to claim 1, wherein determining a distance and/or a frequency offset between a first node and an second node comprises:
    combining, preferably adding, the first phase difference with each of the third phase differences and combining, preferably adding, the second phase difference with each of the fourth phase differences.

4. Method for determining a distance and/or a frequency offset between a first node and an second node in a wireless network, the method comprising:
    the first node transmitting request messages based on carrier signals at different carrier frequencies to the second node and receiving for each of the request signals, a time series of response messages from the second node, wherein for each of the request messages the time series of response messages being transmitted based on one of reference carrier signals, each one of the reference carrier signals being transmitted at one of reference carrier frequencies by the second node to the first node, wherein the carrier frequencies and the reference carrier frequencies form frequency channels between the first node and the second node;
    the first node receiving first phase differences from the second node, each of the first phase differences defining a difference between a phase of one the carrier signals and a phase of one of the reference carrier signals at a predetermined time instance associated with one of first request messages, the frequency of the one of the carrier signals and the frequency of the one of the reference carrier signals being in the same frequency channel;
    the first node determining second phase differences based on the request signals and the response messages, the determining of the second phase differences including computing for each one of the carrier signals phase differences, each of the phase differences defining a difference between a phase of one of the reference carrier signals and a phase of one of the carrier signals at a predetermined time instance associated with one of the time series of response messages; and,
    the first node and/or the second node or a further node determining a distance and/or a frequency offset between the first node and the second node based on the first phase differences and the second phase differences.

5. Method according to claim 4, wherein differences between one or more first carrier frequencies and one or more second carrier frequencies of the carrier frequencies are integer multiples of a predetermined frequency difference.

6. Method according to claim 4, wherein the second node transmits the response messages at an n-th carrier frequency as a time sequence of response messages to the first node, wherein a time interval between the p-th and the (p+1)-th response message of a time sequence of response messages is defined as $\Delta t^{(n,p+1)} - \Delta t^{(n,p)} = \Delta t/n$, where $p=1, \ldots, P-1$ and $n=1, \ldots, N$.

7. Method according to claim 5, wherein determining a distance and/or a frequency offset between the first node and the second node comprises:
    the first node determining a matrix M, preferably a P×N matrix, each element $m(n, p)$ of the matrix M being based on the phase difference of the n-th request message and the phase difference of the p-th response message to the n-th request message.

8. Method according to claim 7, further comprising:
    determining a low-rank approximation of M, preferably a rank-one approximation of M, and determining principal orthonormal basis vectors u and v with dimensions P and N, respectively; and
    determining a frequency offset based on the vector u and a distance based on the vector v.

9. Method according to claim 8, further comprising:
    determining a best fit for a constant $\varphi$, where $\varphi$ is defined by $\varphi^{i-j} \approx u_i/u_j$ for one or more pairs of elements $u_i$, $u_j$ of the vector u wherein $i,j=1, \ldots, P$ and $i \neq j$; and/or
    determining a best fit for a constant $\gamma$, where $\gamma$ is defined by $\gamma^{i-j} \approx v_i/v_j$ for one or more pairs of elements $v_i$, $v_j$ of the vector v wherein $i,j=1, \ldots, N$, and $i \neq j$.

10. Method according to claim 9, wherein the best fit for p and/or the best fit for y is determined using a least squares method or using a weighted least squares method.

11. Method according to claim 1, further comprising:
    determining a difference in clock rate between the first node and the second node based on the frequency offset.

12. Method according to claim 11, further comprising:
    synchronising a clock of the first node and a clock of the second node based on the frequency offset.

13. Method according to claim 1, wherein the first node and the second node communicate on the basis of a WiFi standard IEEE 802.11 a/g/b/ac/ah/n/p, a Bluetooth standard, a ZigBee standard IEEE 802.15.4 or a wireless telecommunication standard such as GSM, UMTS, LTE, NB-IoT, 5G NR, LoRA, Sigfox, and/or, wherein the request and response messages have a data format in accordance to the WiFi standard IEEE 802.11 a/g/b/ac/ah/n/p, the Bluetooth standard, or the ZigBee standard IEEE 802.15.4 or a wireless telecommunication standard such as GSM, UMTS, LTE, NB-IoT, 5G NR, LoRA, Sigfox.

14. Method for determining a position of a first node, comprising:
    determining a plurality of distances based on claim 1; and
    determining a position based on the plurality of distances.

15. Method according to claim 1, wherein computing a distance between the first node and the second node comprises computing a distance based on a path delay.

16. Method according to claim 1, wherein the first node comprises a transceiver, an oscillator coupled to a frequency synthesizer for generating N carrier signals at N different carrier frequencies and a phase detector configured to determine a phase difference between a phase of a response signal received by the first node from the second node and a phase of a carrier signal selected from the N carrier signals.

17. Method according to claim 1, wherein the first node and second node are radio devices configured for communication over narrowband radio channels.

18. A wireless node comprising a transceiver, an oscillator coupled to a frequency synthesizer for generating carrier signals at different carrier frequencies, a phase detector configured to determine a phase difference between a phase of a response signal received by the node from a further node and a phase of a carrier signal selected from the different carrier signals, a computer readable storage medium having at least part of a program embodied therewith; and, a processor, preferably a microprocessor, coupled to the computer readable storage medium and the transceiver, wherein responsive to executing the computer readable program code, the processor is configured to perform executable operations comprising:

transmitting a first request message based on a first carrier signal to the further node and receiving a plurality of first response messages from the further node, the plurality of first response messages being transmitted based on a first reference carrier signal by the further node to the node;

transmitting a second request message based on a second carrier signal to the further node and receiving a plurality of second response messages from the further node, the plurality of second response messages being transmitted based on a second reference carrier signal by the further node to the node;

receiving a first phase difference and second phase difference from the further node, the first phase difference defining a difference between a phase of the first carrier signal and a phase of the first reference carrier signal at a predetermined time instance associated with the first request message and the second phase defining a difference between a phase of the second carrier signal and a phase of the second reference carrier signal at a predetermined time instance associated with the second request message;

determining a set of third phase differences and a set of fourth phase differences based on the plurality of first response messages and the plurality of second response messages respectively, each of the set of third phase differences defining a difference between a phase of the first reference carrier signal and a phase of the first carrier signal at a predetermined time instance associated with one of the plurality of first response messages; and, each of the set of fourth phase differences defining a difference between a phase of the second reference carrier signal and a phase of the second carrier signal at a predetermined time instance associated with one of the plurality of second response messages; and, optionally, determining a distance and/or a frequency offset between the node and the further node based on the first and second phase difference and the set of third and fourth phase differences.

19. A wireless node comprising a transceiver, an oscillator coupled to a frequency synthesizer for generating carrier signals of different carrier frequencies, a phase detector configured to determine a phase difference between a phase of a response signal received by the node from an further node and a phase of a carrier signal selected from the N carrier signals, a computer readable storage medium having at least part of a program embodied therewith; and, a processor, preferably a microprocessor, coupled to the computer readable storage medium and the transceiver, wherein responsive to executing the computer readable program code, the processor is configured to perform executable operations comprising:

transmitting request messages based on carrier signals at carrier frequencies to the further node and receiving for each of the request signals, a time series of response messages from the further node, wherein for each of the request messages the time series of response messages being transmitted based on one of reference carrier signals, each one of the reference carrier signals being transmitted at one of reference carrier frequencies by the further node to the node, wherein the carrier frequencies and the reference carrier frequencies form frequency channels between the node and the further node;

receiving first phase differences from the further node, each of the first phase differences defining a difference between a phase of one the carrier signals and a phase of one of the reference carrier signals at a predetermined time instance associated with one of first request messages, the frequency of the one of the carrier signals and the frequency of the one of the references carrier signals being in the same frequency channel;

determining second phase differences based on the request signals and the response messages, the determining of the second phase differences including computing for each one of the carrier signals phase differences, each of the phase differences defining a difference between a phase of one of the reference carrier signals and a phase of one of the carrier signals at a predetermined time instance associated with one of the time series of response messages; and, optionally, determining a distance and/or a frequency offset between the node and the further node based on the first phase differences and the second phase differences.

20. Wireless node configured to execute the method according to claim 1.

21. Non-transitory computer readable medium comprising software code portions configured for, when run by a computer, executing the method according to claim 1.

* * * * *